US011653279B2

(12) United States Patent
Kadiri et al.

(10) Patent No.: US 11,653,279 B2
(45) Date of Patent: May 16, 2023

(54) UE CAPABILITY EXCHANGE FOR HANDOVER

(71) Applicant: QUALCOMM Incorporated, San Diego, CA (US)

(72) Inventors: Prasad Reddy Kadiri, San Diego, CA (US); Alberto Rico Alvarino, San Diego, CA (US); Umesh Phuyal, San Diego, CA (US); Arash Mirbagheri, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/897,691

(22) Filed: Jun. 10, 2020

(65) Prior Publication Data

US 2021/0029605 A1  Jan. 28, 2021

Related U.S. Application Data

(60) Provisional application No. 62/878,195, filed on Jul. 24, 2019.

(51) Int. Cl.
*H04W 4/00* (2018.01)
*H04W 36/18* (2009.01)
(Continued)

(52) U.S. Cl.
CPC .......... *H04W 36/18* (2013.01); *H04W 8/24* (2013.01); *H04W 36/0069* (2018.08); *H04W 36/06* (2013.01); *H04W 36/08* (2013.01)

(58) Field of Classification Search
CPC ..... H04W 8/22; H04W 8/24; H04W 36/0005; H04W 36/0011; H04W 36/0069;
(Continued)

(56) References Cited

U.S. PATENT DOCUMENTS

2006/0286945 A1* 12/2006 Reznik ............. H04W 36/0094
                                                                 455/101
2010/0330993 A1* 12/2010 Kone ................ H04W 36/0079
                                                                 455/436

(Continued)

FOREIGN PATENT DOCUMENTS

WO      2013112952 A1    8/2013

OTHER PUBLICATIONS

CMCC: "Discussion on SUL and UL Sharing Band Definition", 3GPP Draft, 3GPP TSG-RAN WG4 Meeting NR#2, R4-1796796, 3rd Generation Partnership Project (3GPP), Mobile Competence Centre, 650, Route Des Lucioles, F-06921 Sophia-Antipolis Cedex, France, vol. RAN WG4, No. Qingdao, China, May 27, 2017-May 29, 2017, Jun. 26, 2017 (Jun. 26, 2017), XP051302749, 6 Pages, Retrieved from the Internet: URL: http://www.3gpp.org/ftp/Meetings_3GPP_SYNC/RAN4/Docs/. [retrieved on Jun. 26, 2017] p. 3.

(Continued)

*Primary Examiner* — Matthew W Genack
(74) *Attorney, Agent, or Firm* — Qualcomm Incorporated

(57) ABSTRACT

A UE transmits to a source base station a capability of the UE associated with a bandwidth class or a band combination. The capability is associated with a handover in which the UE maintains connections with the source base station and a target base station. The UE receives a handover message comprising at least one of a target base station configuration to apply during handover execution or a source base station configuration to apply during handover execution based on the capability of the UE. The UE establishes a connection with the target base station and maintains a connection with the source base station over a period of time during the handover. The UE communicates with the source base station and the target base station during handover execution using at least one of the target (Continued)

base station configuration or the source base station configuration.

28 Claims, 18 Drawing Sheets

(51) Int. Cl.
*H04W 8/24* (2009.01)
*H04W 36/08* (2009.01)
*H04W 36/06* (2009.01)
*H04W 36/00* (2009.01)

(58) Field of Classification Search
CPC . H04W 36/0083; H04W 36/06; H04W 36/08; H04W 36/18
See application file for complete search history.

(56) References Cited

U.S. PATENT DOCUMENTS

| | | | |
|---|---|---|---|
| 2016/0112913 A1* | 4/2016 | Malkamaki | H04W 36/0069 455/444 |
| 2018/0343682 A1* | 11/2018 | Tang | H04L 41/08 |
| 2019/0141731 A1* | 5/2019 | Yoshimoto | H04W 72/12 |
| 2020/0396270 A1* | 12/2020 | Viljamaa | H04N 21/64322 |
| 2022/0201563 A1* | 6/2022 | Li | H04W 36/0027 |

OTHER PUBLICATIONS

International Search Report and Written Opinion—PCT/US2020/037251—ISA/EPO—dated Sep. 4, 2020.
OPPO: "Discussion on Capability Coordination for LTE Mobility Enhancements", 3GPP Draft, 3GPP TSG-RAN2 Meeting #104, R2-1816465, 3rd Generation Partnership Project (3GPP), Mobile Competence Centre, 650, Route Des Lucioles, F-06921 Soph, vol. RAN WG2, No. Spokane, USA, Nov. 12, 2018-Nov. 16, 2018, Nov. 12, 2018 (Nov. 12, 2018), XP051556047, 3 Pages, Retrieved from the Internet: URL: http://www.3gpp.org/ftp/Meetings%5F3GPP%5FSYNC/RAN2/Docs/R2%2D1816465%2Ezip. [Retrieved on Nov. 12, 2018] p. 2. figure 2.
Qualcomm Incorporated: "UE RF Chain Requirements to Reduce LTE eMBB HO Interruption Time Close to 0ms", 3GPP Draft, 3GPP TSG-RAN WG2 Meeting #105bis, R2-1904625, V5, 3rd Generation Partnership Project (3GPP), Mobile Competence Centre; 650, Route Des Lucioles; F-06921 Sophia-Antipolis Cedex; France, vol. RAN WG2, No. Xian, China; Apr. 8, 2019-Apr. 12, 2019, Mar. 29, 2019, XP051693827, 6 Pages, Retrieved from Internet: URL:http://www.3gpp.org/ftp/TSG_RAN/WG2_RL2/TSGR2_105bis/Docs/R2-1904625.zip [retrieved on Mar. 29, 2019], paragraph [0002].
VIVO: "Capability Coordination Between the Source and Target Node", 3GPP Draft, 3GPP TSG-RAN WG2 Meeting #106, R2-1905977, 3rd Generation Partnership Project (3GPP), Mobile Competence Centre, 650, Route Des Lucioles, F-06921 Sophia-Antipolis, vol. RAN WG2, No. Reno, USA, May 13, 2019-May 17, 2019, May 3, 2019 (May 3, 2019), XP051710321, 2 Pages, Retrieved from the Internet: URL: http://www.3gpp.org/ftp/tsg%5Fran/WG2%5FRL2/TSGR2%5F106/Docs/R2%2D1905977%2Ezip. [retrieved on May 3, 2019] p. 1.

* cited by examiner

UE CAPABILITY EXCHANGE FOR HANDOVER

CROSS REFERENCE TO RELATED APPLICATION(S)

This application claims the benefit of U.S. Provisional Application Ser. No. 62/878,195, entitled "UE Capability Exchange for Handover" and filed on Jul. 24, 2019, which is expressly incorporated by reference herein in its entirety.

BACKGROUND

Technical Field

The present disclosure relates generally to communication systems, and more particularly, to methods and apparatus related to handover procedures in wireless communication systems.
Introduction
Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus transmits, to a source base station, a capability of the UE associated with a bandwidth class or a band combination, the capability being associated with a handover in which the UE maintains connections with the source base station and a target base station. The apparatus receives a handover message from a source base station serving the UE to handover from the source base station to a target base station, wherein the handover message comprises at least one of a target base station configuration to apply during handover execution or a source base station configuration to apply during handover execution based on the capability of the UE. The apparatus establishes a connection with the target base station and maintains a connection with the source base station over a period of time during the handover. The apparatus communicates with the source base station and the target base station during handover execution using at least one of the target base station configuration or the source base station configuration.

In an aspect of the disclosure, a method, a computer-readable medium, and an apparatus are provided for wireless communication at a source base station. The apparatus receives, from a UE, a capability of the UE associated with a bandwidth class or a band combination, the capability being associated with a handover in which the UE maintains connections with the source base station and a target base station. The apparatus transmits a handover message the UE to handover from the source base station to a target base station, wherein the handover message comprises at least one of a target base station configuration to apply during handover execution or a source base station configuration to apply during handover execution based on the capability of the UE. The apparatus maintains a connection with the UE over a period of time during the handover and communicates with the UE during the handover execution using at least the source base station configuration.

In an aspect of the disclosure, a method, a computer-readable medium, and an apparatus are provided for wireless communication at a target base station. The apparatus receives, from a source base station a capability of the UE associated with a bandwidth class or a band combination, the capability being associated with a handover in which the UE maintains connections with the source base station and a target base station. The apparatus transmits, to the source base station, a target base station configuration to apply during handover execution or a source base station configuration to apply during handover execution based on the capability of the UE. The apparatus communicates with the UE during the handover execution using at least the target base station configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
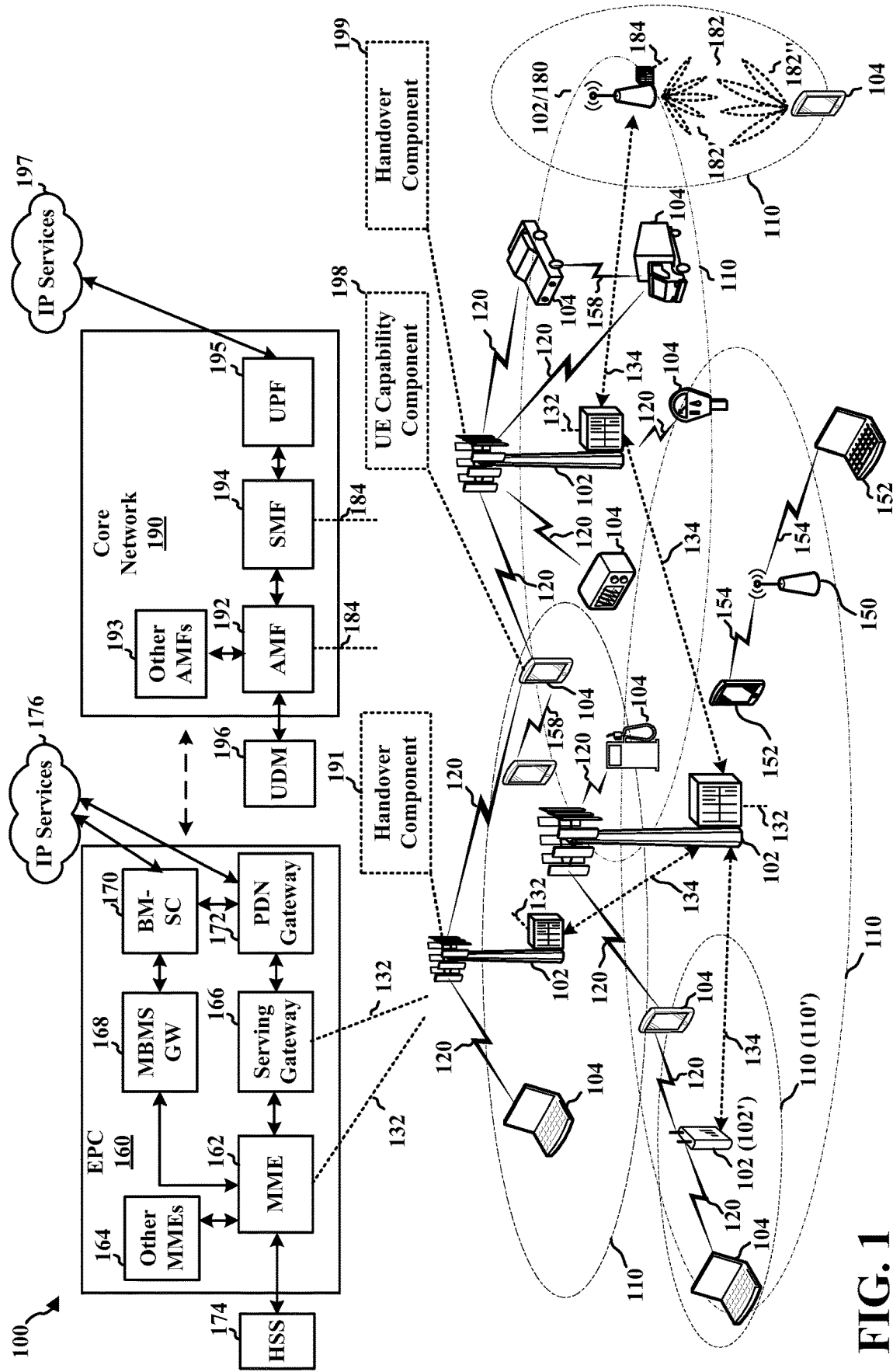
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface, N2, N3, or other interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface, Xn interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The term "carrier" may refer to a set of radio frequency spectrum resources having a defined physical layer structure for supporting communication links. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 104. A carrier may be operated in a standalone mode where initial acquisition and connection may be conducted by UEs 104 via the carrier, or the carrier may be operated in a non-standalone mode where a connection is anchored using a different carrier (e.g., of the same or a different radio access technology).

The wireless communications system may support synchronous or asynchronous operation. For synchronous operation, the base stations 102 may have similar frame timings, and transmissions from different base stations 102 may be approximately aligned in time. For example, the base stations may have a timing differences that is less than a timing offset limit, e.g., a maximum timing difference allowed by CA. For asynchronous operation, the base stations 102 may have different frame timings so that the frame timings are not aligned in time. Asynchronous timing may be completely variable or may be based on an upper limit for asynchronous operation. Base stations that are associated with the same timing advance group (TAG) may have timing that is aligned so that the base stations share the same timing. Aspects described herein may be used for either synchronous or asynchronous operations.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 104 may communicate with a base station 102 (which may be referred to as a source base station) as part of an active connection on a selected serving cell. In some implementations, however, a UE may experience degraded signal quality or reduced signal power due to signaling interference or mobility within the wireless communication system. Based on the variation in signal quality or signal power, the UE may be handed over from the source base station 102 to a different base station 102 (referred to as a target base station) within the wireless communication system. Prior to handover the UE may transmit a UE capability which may include band information, such as a list of bands and band combinations that the UE may be capable of supporting during various handover procedures, for example, during enhanced make before break (eMBB) handover.

In some cases during capability signaling, the UE may transmit a capability message. After transmitting the capability indication to the source base station, the UE may receive a radio resource control (RRC) connection configuration or reconfiguration request from the source base station. In some cases, the RRC connection configuration may indicate a measurement configuration to the UE. The UE may initiate periodic measurement of the active communication on the serving cell, and may transmit an RRC measurement report based on the RRC configuration or reconfiguration request and measurement configuration.

Based on the identified UE capability and measurement reporting, the source base station may determine a source base station configuration for the UE to apply during handover execution and may transmit a handover command to initiate a handover procedure to a target base station. In response, the target base station may transmit a target base station configuration to the source base station, which may include a target base station configuration to be used during handover of the UE and/or optionally a target base station configuration to be used after successful handover of the UE. After receiving the target base station configuration, the source base station may transmit an RRC reconfiguration request to the UE which may include the target and source base station configurations for the UE to apply during handover execution. In some examples, the UE may maintain connections with both the source and target base stations using the received configurations. The UE may transmit a message to the target base station indicating the successful completion of the handover procedure. In some cases, the UE may end or release a connection with source base station after establishing a connection with the target base station. After successful handover to the target base station, the UE may release the source connection based on a timer or based on an RRC message received from the target base station for releasing the source base station connection. After releasing the connection with the source base station, the UE may change its configuration to the full target base station configuration.

Referring again to FIG. 1, in certain aspects, a base station 102 may operate as a source base station in a handover. Thus, a base station may include a handover component 191 configured to receive, from a UE, a capability of the UE and transmits a handover message to the UE to handover from the source base station to a target base station, wherein the handover message comprises at least one of a target base station configuration to apply during handover execution or a source base station configuration to apply during handover execution based on the capability of the UE. Another base station 102 may operate as the target base station in the handover. Such a base station 102 may include a handover component 199 configured to receive from a source base station a capability of a UE and transmits, to the source base station, a target base station configuration to apply during handover execution or a source base station configuration to apply during handover execution based on the capability of the UE. The UE involved in the handover may include a UE capability component 198 configured to transmit to a source base station a capability of the UE, e.g., relating to handover. The UE may establish a connection with the target base station and maintain a connection with the source base station during the handover procedure. The UE may communicate with the source base station and the target base station using configurations based on the UE capability provided to the source base station. Although the following description may be focused on LTE or 5G NR, the concepts described herein may be applicable to other similar areas, such as 5G NR, LTE, LTE-A, CDMA, GSM, and other wireless technologies.

Figure 2:
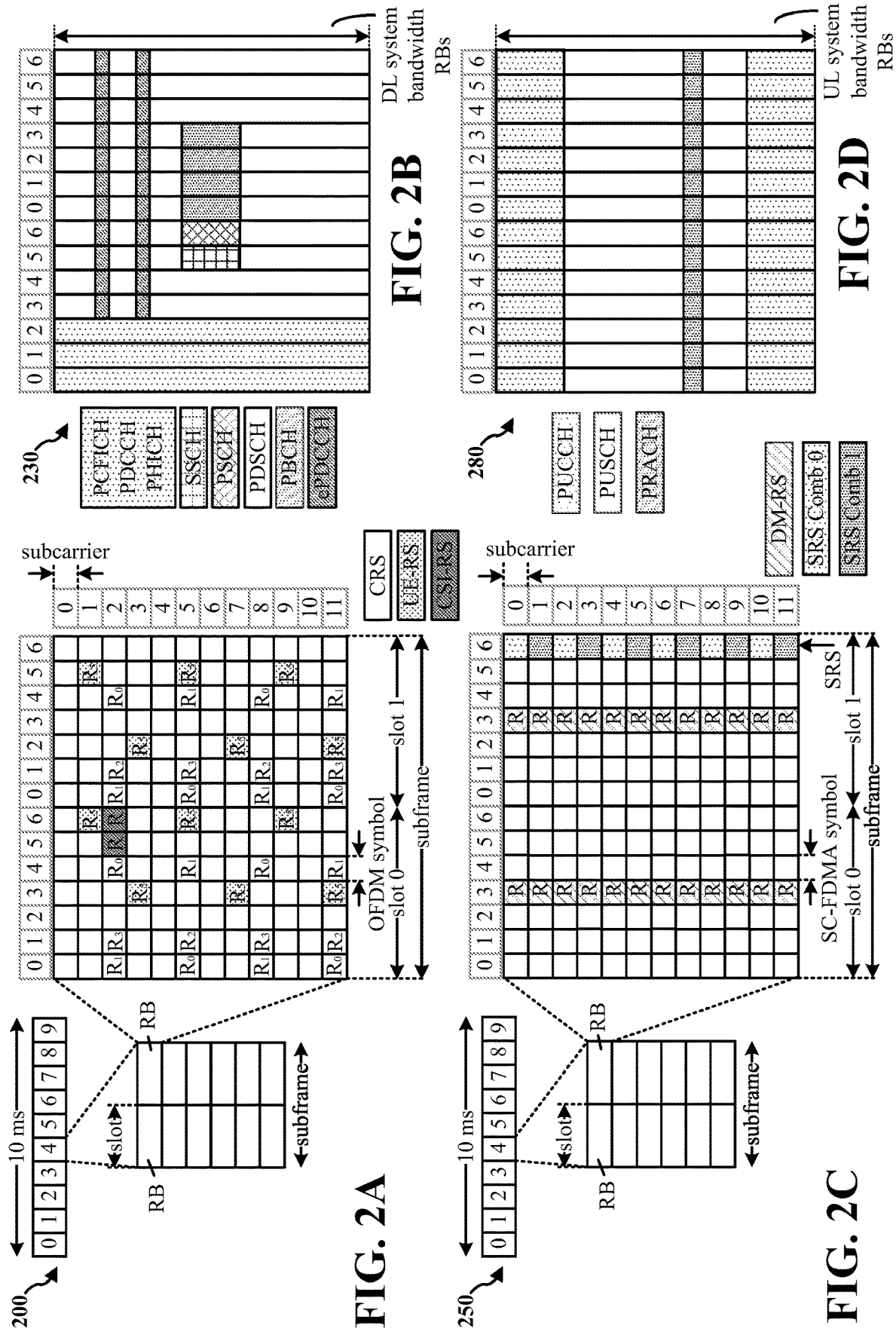
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a DL frame structure in LTE.

FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
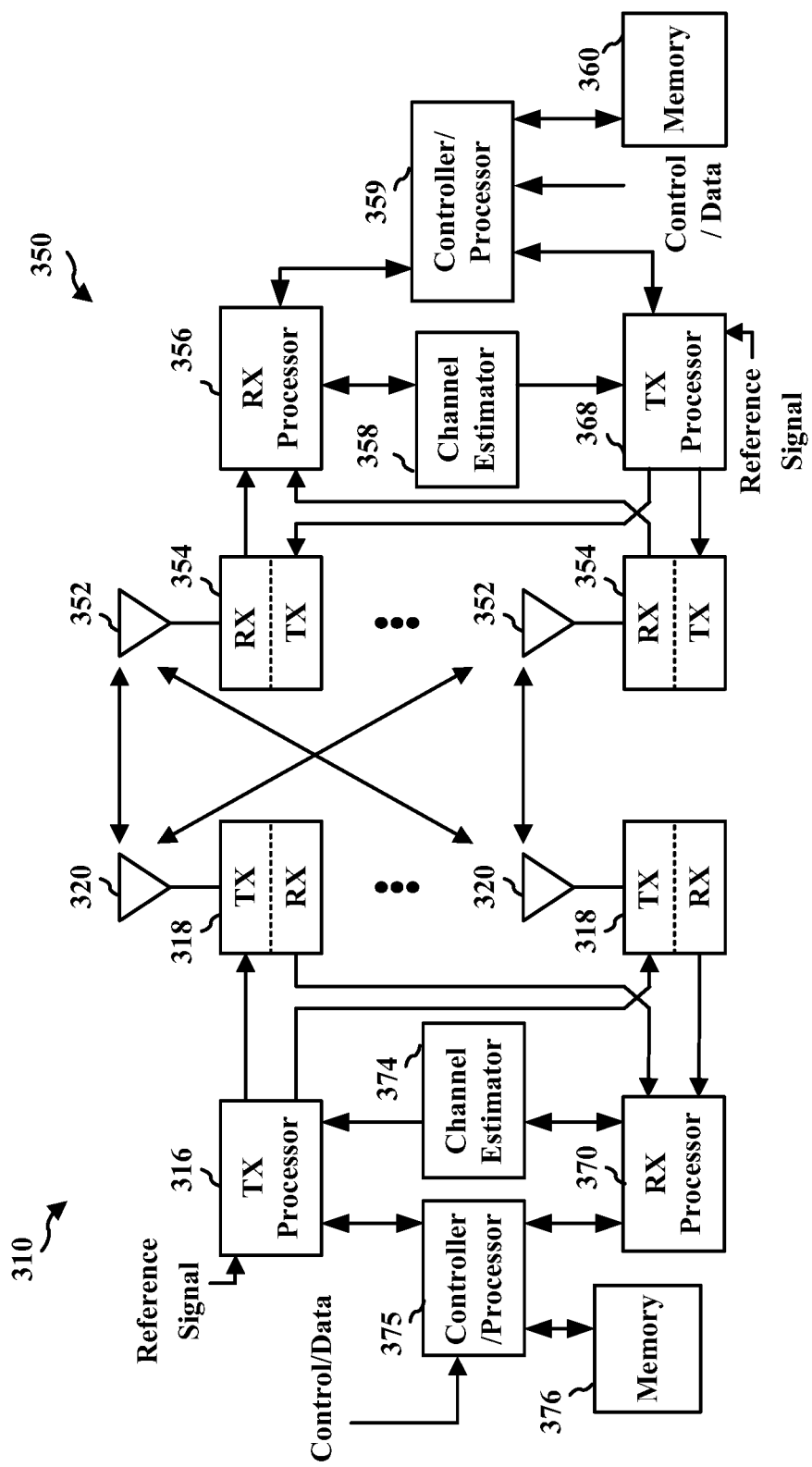
FIG. 3 is a diagram illustrating an example of a base station and user equipment (UE) in an access network.

FIG. 3 is a block diagram of a base station 310, e.g., an eNB, in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE capability component 198 of FIG. 1.

At least one of the TX processor 316, the RX processor 370, and the controller/processor 375 may be configured to perform aspects in connection with the handover component 191 or 199 of FIG. 1.

As a UE moves relative to a base station, the UE may be better served by a different base station. Thus, a handover may be performed from a source base station that currently serves the UE to the other base station, e.g., a target base station. Aspects presented herein improve or enhance handover procedures in wireless communication systems. Aspects presented herein may improve the reliability of handover procedures, reduce a failure rate of handover procedures, reduce instances of ping pongs within handover procedures, and/or improve latency for handover procedures. Aspects may help to bring the handover interruption latency close to a 0 ms goal. A reduction in interruption latency may be beneficial for real time gaming applications and other ultra-reliable low latency communication (URLLC) applications.

In order to meet the aforementioned handover performance requirements, a dual active stack based make-before-break (MBB) or enhanced MBB (eMBB) handover can be utilized. In case of enhanced MBB handover, when the source base station sends handover command including eMBB handover indication (RRC Connection Reconfiguration Message with Mobility Control Info) to the UE, then the UE will continue to maintain an active connection with the source base station using a protocol stack associated with the source base station. The UE may configure another protocol stack with the target base station configuration and perform handover to the target base station. During handover execution period, the UE may use different RF chains for having simultaneous data downlink and uplink communication with both source and target base stations.

Figure 4:
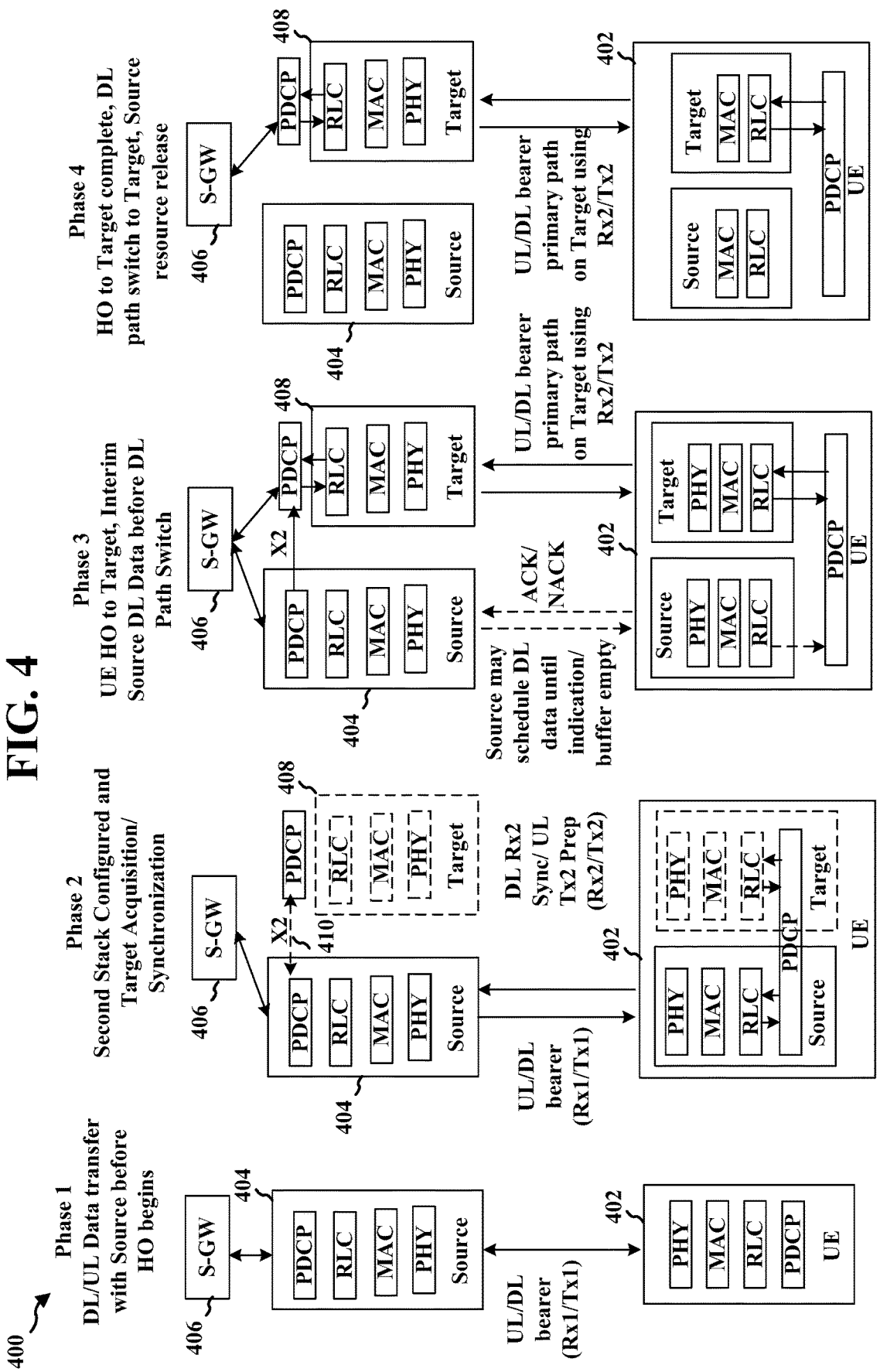
FIG. 4 illustrates an example of use of two stacks during a handover from a source base station to a target base station.

FIG. 4 illustrates an example 400 showing the use of a dual active stack during a handover procedure from a source base station 404 to a target base station 408 using two UE protocol stacks. FIG. 4 illustrates phase 1 (e.g., prior to the handover), phase 2 (e.g., a configuration phase), phase 3 (e.g., a handover phase), and phase 4 (e.g., a completion phase). The UE 402 may use a protocol stacking including a PHY layer, a MAC layer, an RLC layer, and a PDCP layer to handle communication with a source base station 404 prior to a handover. The source base station may use a similar protocol stack comprising a PHY layer, a MAC layer, an RLC layer, and a PDCP layer. The UE may transmit/receive communication over an uplink/bearer with the source base station 404 using the protocol stack at the UE. In some aspects, the UE may have a connection with the base station that is associated with a particular communication chain (e.g., receive chain, transmit chain, radio frequency (RF) chain, etc.) of the UE. For example, the UE may have multiple communication chains, at least one of the communication chains being associated with the source base station. The source base station may be associated with or have a connection with a serving gateway (S-GW) 406. For example, the connection may be based on a data path of the UE, and/or may be configured by a mobility management entity (MME).

At phase 2, the UE and the source base station may begin a configuration phase of the handover. The UE may identify a target base station, e.g., based at least in part on a measurement of the source base station and/or the target base station, e.g., an offset between a signal power or signal quality. The UE may provide a measurement report to the source base station identifying the target base station. The source base station may establish a backhaul interface, e.g., an X2 interface 410, Nx interface, etc., with the target base station 408 (e.g., with an L2 layer of the target base station). The backhaul interface may be used to exchange configuration information, timing information, and/or uplink or downlink data associated with the handover of the UE from the source base station to the target base station. The UE 402 may generate or configure a second protocol stack, e.g., a target protocol stack associated with the target base station. By using the source protocol stack and the target protocol stack during the handover, the UE can continue active communication with the source base station using the source protocol stack while the handover is configured with the target base station using the target protocol stack, thereby reducing a delay or latency associated with the handover.

The target protocol stack of the UE may perform synchronization and/or handover preparation with regard to the target base station. For example, the target protocol stack may synchronize based on synchronization signals sent by the target base station. The target protocol stack may be associated with a different communication chain than the communication chain(s) associated with the source protocol stack. Additionally, or alternatively, the source protocol stack and the target protocol stack may be associated with one or more shared communication chains. The example in FIG. 4 illustrates the source protocol stack and the target protocol stack may use a shared PDCP layer. For example, the shared PDCP layer may handle different security keys and different robust header compression (ROHC) context for the source base station and for the target base station. This may simplify UE PDCP implementation and use common PDCP sequence number maintenance, re-ordering, duplicate detection and discarding function and common UE buffer management to conserve processor resources that would otherwise be used to operate two PDCP layers.

As illustrated at phase 3, the UE, the source base station, and the target BS may enter the handover phase. The target base station 408 may have a connection with the S-GW 406. The target base station may configure the connection with the S-GW based on a handover request from the source base station. The target base station's connection with the S-GW may be later used for a data path for the UE.

The target protocol stack at the UE and the target base station may establish a connection (e.g., an uplink bearer and/or a downlink bearer). The target protocol stack at the UE may initiate the connection with the target base station 408 before the connection with the source base station 404 is released, thereby reducing interruption associated with the handover.

The UE may use a form of carrier aggregation to simultaneously connect with the source base station 404 and the target base station 408. For example, a UE supporting 5 component carriers may redirect one or more component carriers from the source base station to the target base station while using one or more remaining component carriers to connect with the source base station. The UE may use MIMO to simultaneously connect with the source base station and the target base station. For example, a UE that supports multiple transmit antennas in a given band may use one of the transmit antennas for the source base station and another of the transmit antennas for the target base station during the handover. An intra-frequency handover may involve a source base station and a target base station that are associated with a same frequency. An inter-frequency handover may refer to a handover in which the source base station and the target base station are associated with different frequencies.

During phase 3, the source base station may continue to provide downlink data as the connection with the target base station is being set up. For example, the source base station may schedule downlink data until the source base station receives an indication from the target base station, until a timer expires, or until a buffer (e.g., a radio link control buffer) of the source base station is cleared (e.g., is emptied). Then, the connection with the source base station may be ended. Additionally, or alternatively, the source base station may provide downlink data to the target base station for transmission to the UE via the connection with the target protocol stack. In this way, interruption of traffic associated with the handover may be reduced, for reduced latency and improved reliability of data transfer during handover. The source base station and the target base station may provide redundant downlink data to the UE, in order to reduce a likelihood of unsuccessful decoding of the data.

In phase 4, the UE, the source base station, and the target base station may enter a completion phase of the handover. The target base station 408 may have a connection with the S-GW 406. For example, S-GW 406 may switch a data path of the UE from the source base station to the target base station (e.g., based on a notification from the target base station that RRC reconfiguration complete message from UE is successfully received). In phase 4, the source base station has released the connection with the source protocol stack of the UE, and the uplink/downlink bearer between the target base station and the UE may be used as a primary data path to the UE.

Figure 5:
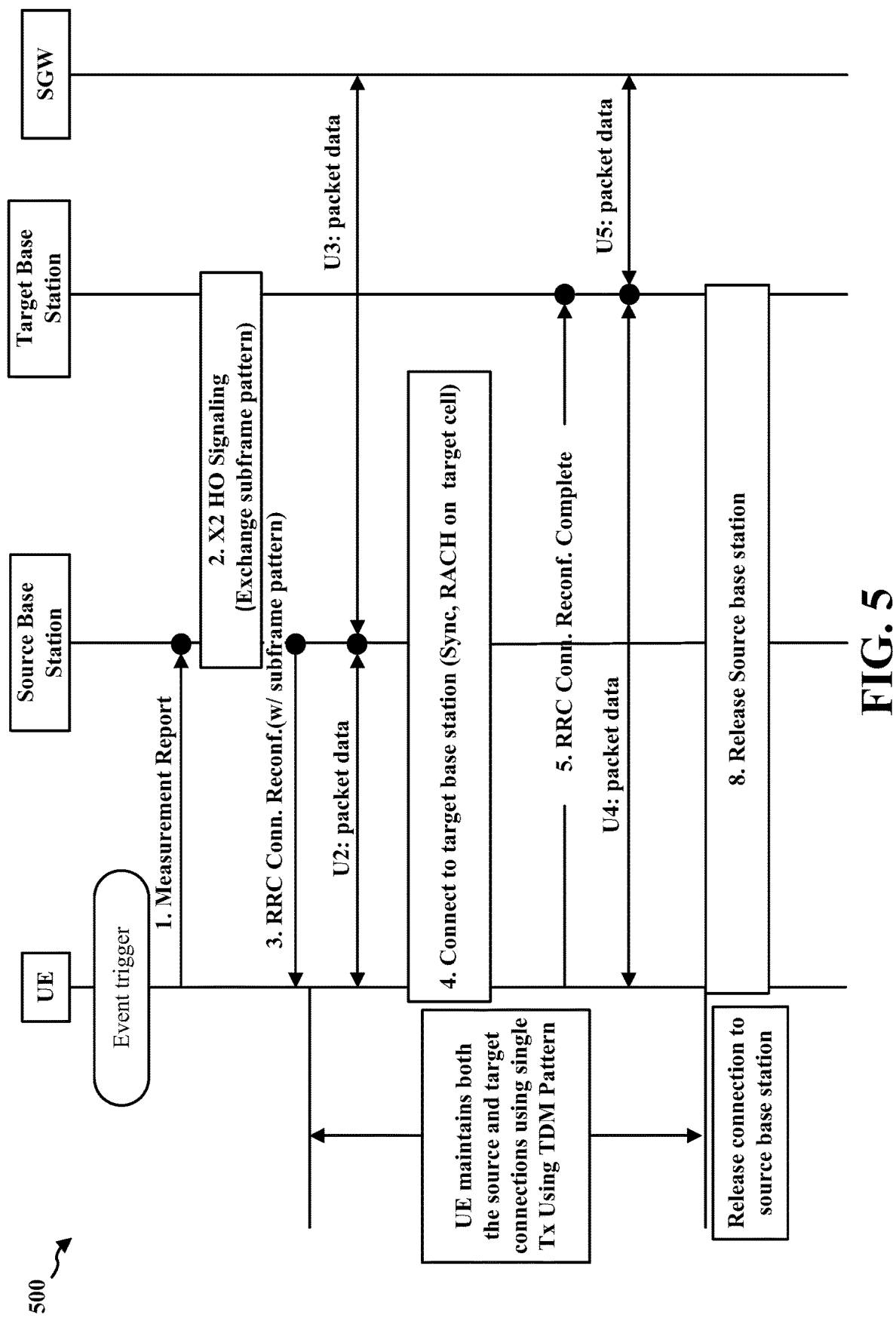
FIG. 5 is an example communication flow for a handover including information about a TDM pattern for communication with a source base station and a target base station during the handover.

FIG. 5 illustrates a handover procedure 500 for a UE from a source base station to a target base station. The source base station and/or the target base station may comprise an eNB, for example. FIG. 5 illustrates transmission sharing using a control plane handover procedure. As shown in FIG. 5, in some aspects, a handover event may be triggered while a UE is connected to the source base station. The UE may experience degraded signal quality or power due to interference, or other communication challenges within a supported coverage area of the serving cell. Additionally, or alternatively, mobility at the UE may experience an increase in signaling attenuation over a communication link with base station. The variation in signal quality or signal power may prompt the base station to initiate a handover process based on certain capabilities relating to handover that are indicated to the source base station by the UE.

The UE may send a measurement report to the source base station. The source base station may then implement an X2 handover signaling. The handover procedure may be a dual active protocol stack-based eMBB handover, such as described in connection with FIG. 4. In such handover procedures, UE may receive a downlink signal or data packet from the source base station, and may simultaneously receive a different signal or data packet from the target base station (e.g., UE may be capable of simultaneous downlink reception of data from both source and target base stations in certain scenarios, e.g., Dual Rx). Similarly, UE may transmit an uplink signal or data packet to the source base station or the target base station. In some cases, the UE may be capable of simultaneous uplink transmission to both source and target eNB in certain scenarios (e.g., Dual Tx). Also, the UE may support certain radio frequency (RF) band combinations based on its transmission chain capability (e.g., UE Tx RF chain capability) and based on whether the UE is intra frequency (synchronous (sync) vs. asynchronous (async)), inter frequency (intra band, inter band, sync vs. async), or the like.

In some cases, simultaneous transmission at UE may support various RF band combinations, or have a RF transmission chain capability. Additionally, the simultaneous transmission may be based on whether transmissions are intra frequency (e.g., intra-frequency handover associated with the same frequency band on different cells), or inter-frequency (e.g., inter-frequency handover associated with different frequency bands on different cells). In some cases, the UE may signal an indication of its capability (e.g., a UE capability message or indicator) to support simultaneous transmission and reception of data from both the source base station and the target base station during the eMBB handover procedure. Such UE capability signaling may in some aspects allow for dual connectivity between both base stations during a handover procedure, and may reduce the amount of time the UE is not connected to a base station during handover. In some examples, the handover may be referred to as a dual active protocol stack (DAPS) handover. This exchange of UE capability information for such a handover may improve user experience and reduce undesirable loss of data which may occur during handover processes.

These transmissions may be based on additional parameters, such as whether the transmissions occur intra-band (e.g., via contiguous component carriers within the same operating frequency band), inter-band (e.g., component carriers associated with different operating frequency bands), or whether they are in phase (sync) or out of phase (async) with an associated relay path. In addition, UE may be configured with a number of RF chains for transmission and reception of signals during a handover procedure. For example, a UE may be configured with one or more of dual Rx/dual transmission (Tx), dual reception (Rx)/single Tx, and single Rx/single Tx RF chains. In certain scenarios (e.g., single Tx, Dual Tx Intra freq async, Dual Tx inter freq-intra band async etc.), if the UE does not support simultaneous transmission to both source and target eNB, the network may provide a TDM pattern for the UE. In some cases, the UE may use the TDM transmission pattern to communicate with the target and source base station in respective time periods, instead of conducting simultaneous transmission with the source and target base stations.

In some handover procedures, the UE may maintain a single PDCP capable of handling dual security keys, dual ROHC for downlink data reception, single ROHC for single uplink data transmission, common re-ordering, duplicate detection and discard function, in sequence delivery to upper layers, PDCP sequence number (SN) allocation, PDCP re-transmission during handover, and so on. The UE may operate according to a stack-based configuration, e.g., as described in connection with FIG. 4, with stacks (e.g., PHY, MAC, and/or RLC stacks) that correspond to the source base station and the target base station.

The handover signaling may include an exchange of information about a subframe pattern with the target base station. Thus, information about an uplink TDM/TDD based transmission sharing subframe pattern may be exchanged between the source base station and the target base station as part of a handover preparation phase, e.g., via an X2 interface. The source base station may then transmit a RRC connection reconfiguration message to the UE. The RRC connection reconfiguration message may include information about the subframe pattern. Thus, information about the uplink TDM/TDD pattern may be communicated to the UE or may be preconfigured to the UE, e.g., when a UE enters a cell through a handover procedure, at the time of RRC connection setup, etc. In some aspects, packet data may be exchanged between the UE and the source base station, as well as between the source base station and a S-GW. The UE may connect to the target base station through a handover RACH procedure. The UE can then transmit an RRC connection reconfiguration complete message to the target base station. Packet data can then be exchanged between the UE and the target base station. The UE can maintain connections to both the source and target base stations and may transmit to both base stations over a period of time during the handover procedure, e.g., using a TDM pattern. For example, the UE may operate during a handover execution phase using a single uplink transmission mode based on a network configured uplink TDM/TDD pattern. In some aspects, the UE can maintain connections to the source and target base stations from the time the UE receives the RRC connection reconfiguration message until the UE releases the connection with the source base station. Once the UE releases the connection with the source base station, the UE may communicate with the target base station without communicating with the source base station. Thus, the uplink TDM/TDD pattern may be released upon a successful release of the source base station using an RRC release indication or based on another timer.

Various types of UEs may perform a handover in which communication is maintained with a source base station during a handover procedure to a target base station, such as described in connection with FIGS. 4 and 5. Examples of different types of UE implementations include dual reception and dual transmission, dual reception and single transmission, or single reception and single transmission. An uplink TDM pattern may be applied, e.g., for sharing a single common uplink transmission between a source and target base station during a handover procedure (e.g., for intra-frequency or inter-frequency handover). A shared, single transmission between the two base stations may help to improve reception and reliability during the handover. Simultaneous dual uplink transmissions might not be possible. For example, a dual uplink transmission might not be possible for intra-frequency, intra-band asynchronous handovers, inter-frequency, intra-band asynchronous handover, etc. As well, inter-frequency simultaneous uplink transmissions, even if possible, may reduce the quality of communication. For example, inter-frequency simultaneous uplink transmissions may cause intermodulation distortion (IMD) and/or cause de-sensitization of downlink reception in certain band combinations.

In some cases, handover processes such as those occurring between wireless devices depicted in FIGS. 4 and 5 (e.g., active stack-based handover) may be subject to a number of challenges. For example, a handover process may have an associated interruption time in the user plane, or a time between the UE ending a connection with the source base station and establishing a connection with the target base station. During such interruption times, data may not be transmitted to or from the UE, resulting in reduced packet throughput and increased data interruption time. As a result, the techniques described herein may reduce the handover interruption time (e.g., to 0 ms or closer to 0 Cms), and may enhance connectivity, reduce latency, and increase data throughput.

In some cases, a UE may indicate at least one capability to the source base station via communication link with the source base station, and the capability may be used in determining and/or performing the handover for the UE.

LTE Dual Connectivity (DC) may support inter-band synchronous DC and inter-band asynchronous DC operation. Intra-band Inter Frequency synchronous and asynchronous operation is supported. Intra band, intra frequency DC is not supported. Inter-band contiguous (all CCs in a given band are contiguous) synchronous DC may support all combinations (i.e. any one band component carriers (CC) can belong to either MCG or SCG) of MCG/SCG among bands and the CCs in one band may belong to a single group so that SCG and MCG cells are not within the same band. Inter-band and intra-band non-contiguous asynchronous operation may include signaling the combinations of MCG/SCG that are supported, in which each CC in a band belongs to one group.

Aspects presented herein enable UE capability signaling that help to enable eMBB handover for any of intra-frequency handover in which a source and target CC share frequency, inter frequency-intra band, inter frequency-inter band for both synchronous and asynchronous handover and/or handovers in which the source and target are for different TAG.

In some cases, the capabilities of the UE 602 may be shared or split between the source and target base stations during the handover procedure. The target and source base stations may further in some cases coordinate sharing or splitting of UE capabilities using the techniques described herein. For a UE capable of dual active protocol stack based handover, in order to support simultaneous transmission and reception of data during handover, UE capability may be shared between both source and target base stations to maintain connectivity with each of the source and target base stations. The following discusses signaling enhancements about how to split UE capability between source and target base stations during a handover execution period and how source and target eNBs coordinate UE capability sharing.

Figure 6:
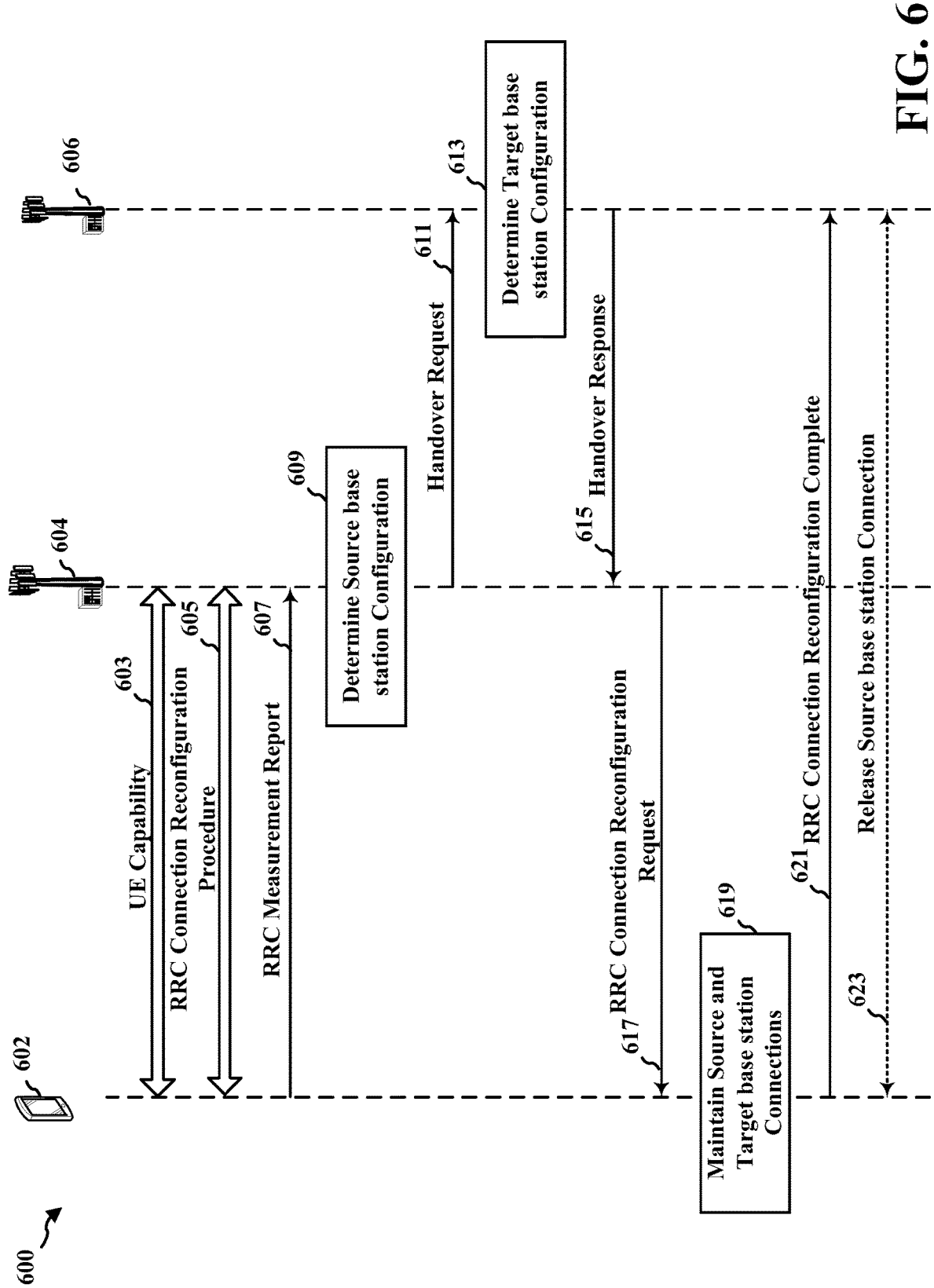
FIG. 6 is an example communication flow for a handover from a source base station to a target base station.

FIG. 6 illustrates an example of a flow diagram 600 that supports enhanced user equipment capability exchange during eMBB handover in accordance with aspects of the present disclosure. Base station 604 may correspond to a source base station in communication with the UE 602, and the base station 606 may correspond to a target base station for handover. The process flow in FIG. 6 may include aspects of simultaneous transmission and reception by the UE 602, as well as various capability transmission aspects. Alternative examples of the following may be implemented, where some steps may be performed in a different order than described or not performed at all. In some implementations, steps may include additional features not mentioned below, or further steps may be added. In some aspects, the source and target base stations may coordinate communication with the UE during and after handover execution using one or more of the capabilities indicated by the UE.

At 603, the UE 602 may transmit, and the source base station 604 may receive, a UE capability, which may be for example, a UE capability information. In some cases, the source base station 604 may transmit a capability inquiry to the UE 602, and the UE 602 may reply with, for example, capability signaling that includes a capability supported by UE 602. If a UE does not indicate a particular capability, the base station may assume that the UE does not support the capability.

The UE capability information may include UE capability signaling for intra-frequency versus inter-frequency handover. Intra-frequency may correspond to frequencies having the same EARFCN or same set of EARFCNs, frequencies having a same bandwidth or set of bandwidths, and/or frequencies having a same numerology (e.g., for NR based communication).

Figure 7:
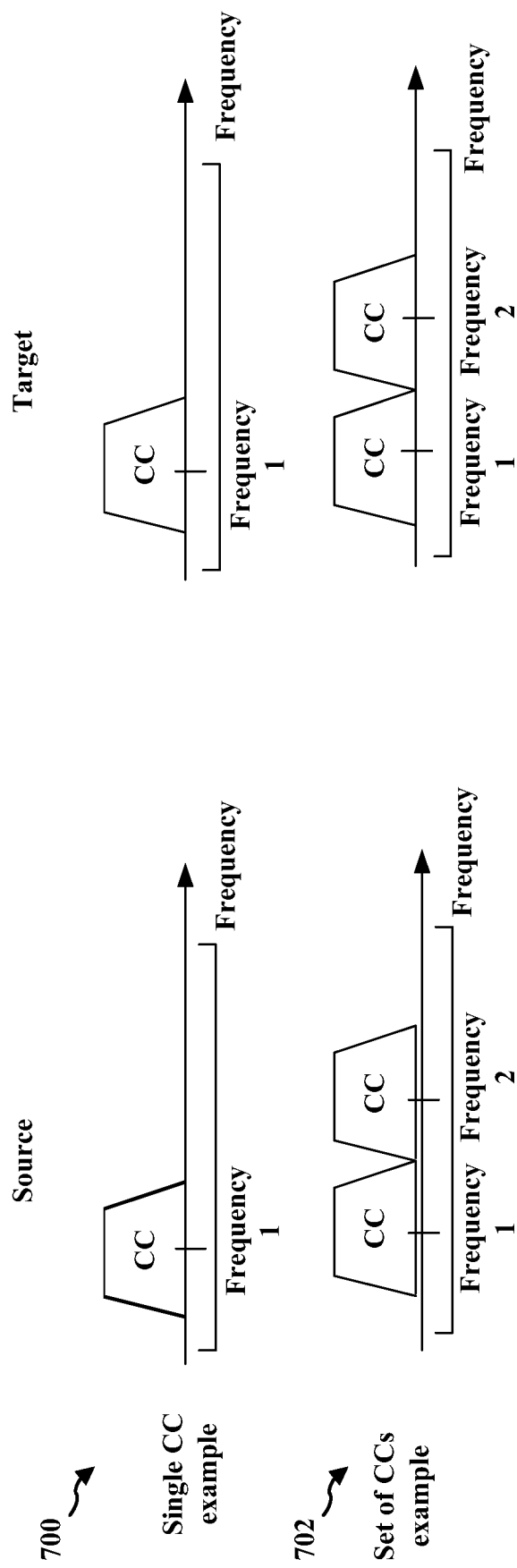
FIG. 7 is an example illustrating an intra-frequency handover.

Intra-frequency may indicate that the UE does not need to reconfigure its RF in order to begin receiving communication from the target base station 606. FIG. 7 illustrates an example of an intra-frequency handover for a same CC of a source cell of a source base station and a target cell of a target base station. The single frequency example 700 illustrates the handover being from a CC at frequency 1 for the source base station to the same CC, also at frequency 1, for the target base station. The example 702 for the set of CCs illustrates an example set of two CCs at frequency 1 and frequency 2 for the source base station. The UE is handed over to the target base station using the CCs at the same set of frequencies (e.g., frequency 1 and frequency 2).

Figure 8:
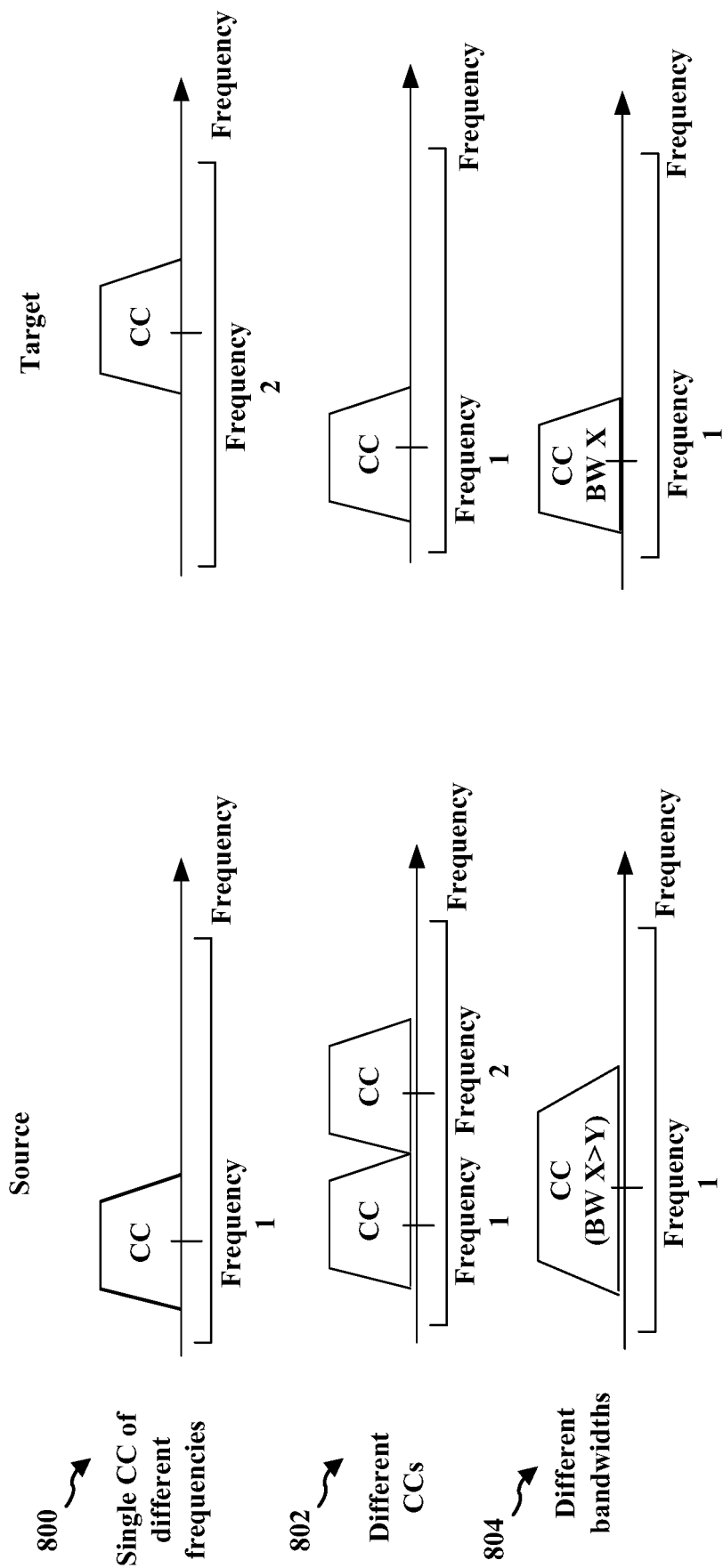
FIG. 8 is an example illustrating an inter-frequency handover.

FIG. 8 illustrates various examples of inter-frequency handovers. A single cc example 800, shows the UE using a CC at a first frequency (frequency 1) with the source base station and using a CC at a different frequency (frequency 2) with the target base station. The example 802 for a different number of CCs shows the UE using a first CC at frequency 1 and a second CC and frequency 2 with the source base station and using single CC at the first frequency with the target base station. Although the CC at frequency 1 is used for both the source base station and the target base station, the change in the CCs corresponds to an inter-frequency handover. The example 804 for different bandwidths shows the UE using a first CC having a wider bandwidth with the source base station and a CC having a narrower bandwidth with the target base station. Although both CCs comprise frequency 1, the different bandwidths correspond to an inter-frequency handover.

From UE implementation perspective, an inter-frequency handover may be more complicated than an intra-frequency handover. Thus, the UE may indicate to a serving base station (that will function as a source base station in a handover) whether the UE supports inter-frequency intra-band handover. For example, the UE may indicate whether the UE is capable for at least one of an inter-frequency handover, an intra-band and inter-frequency handover, and/or an inter-band handover. The UE may also indicate a capability for an intra-frequency handover.

Figure 9:
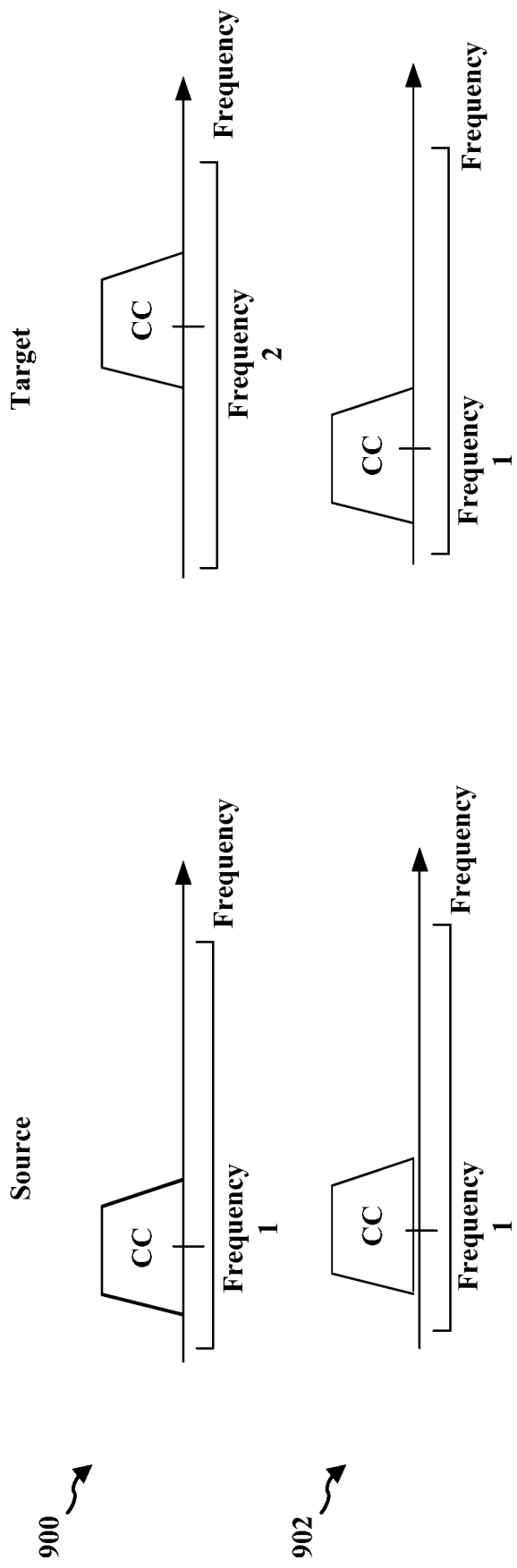
FIG. 9 is an example illustrating combinations of bandwidth class.

As another example, the UE may indicate to the base station a number of supported CCs for an intra-band handover. For example, the UE may indicate a total number of CCs that are supported for intra-band handover using a CA bandwidth class. The bandwidth class may indicate, e.g., a maximum number of CCs supported by the UE and/or a maximum bandwidth supported by the UE. As an example, for bandwidth class C, the UE may support 2 CCs and less than 40 MHz. The CC may be overlapped or not overlapped. FIG. 9 illustrates examples 900, 902 of bandwidth class C for 2 CCs and 40 MHz. The total number of CCs indicated by the UE may include overlapped CCs for intra-frequency handover. Downlink and uplink bandwidth classes may be indicated separately. Thus, the UE may separately indicate the number of CCs supported for uplink communication and the number of CCs supported for downlink communication for a handover.

As another example, the UE may indicate whether the UE supports synchronous handover or asynchronous handover. For example, the UE may indicate support for at least one of synchronous handover for synchronous source cell and target cell and/or asynchronous handover for an asynchronous source cell and target cell. For example, the UE may indicate support for asynchronous handover per band combination and per band of band combination. The UE may similarly indicate support for synchronous handover per band combination and per band of band combination.

As another example, the UE capability may indicate whether or not a TDM pattern is needed for communication with the source base station and the target base station during the handover procedure. For example, a structure similar to sounding reference signal (SRS) switching can be employed to indicate for which bands of uplink communication (e.g., for the source/target) the UE is capable of switching to another band with uplink communication (e.g., for the other of the source/target). The UE may indicate a switching time to switch between the band for the source and the band for the target. For intra-frequency handovers, uplink CCs of the source and target base stations may overlap and may lead to multi-cluster PUSCH is an RB allocation in the uplink is non-contiguous between the source base station and the target base station. Thus, support for intra-frequency handovers may indicate a need for a TDM pattern for uplink communication during the handover.

With regard to TAGs, if the band combination comprised of more than one band entry (i.e., inter-band or intra-band non-contiguous band combination), a capability field may indicate that the same or different timing advances on different band entries are supported. If the band combination comprised of one band entry (i.e., intra-band contiguous band combination), the field indicates that the same or different timing advances across component carriers of the band entry are supported. Such an indication may limit an indication of support for different TAGs within a band for inter-band CA. However, a UE may indication a capability for inter-band CA with shared bands (e.g., with a TAG for the source base station and a TAG for the target base station being different). For example, the UE may indicate support for multiple TAGs within the same band that is shared between two nodes or between two base stations for inter-band handover. In an example, Band 1, Band 2, and Band 3 may be supported by the UE with Band 1 and Band 2 belonging to different TAGs. In this example, the UE may signal a capability to support TAG1 and TAG2 in the same Band 3 (e.g., when Band 3 is shared between two nodes or between the source base station and the target base station).

As an example, a first option for signaling the UE capabilities to the source base station (or for signaling the UE's capabilities from the source base station to the target base station) may allow for intra-band and inter-band handover. In some aspects, the option may not enable mixed band inter-band handover and may not solve the challenges with multiple TAGs for intra-band handover. An example signaling structure may include for a band combination:
A. An array [N] of bands
 i. Bandwidth class
 ii. Capabilities for each Band of Band Combination (BoBC)
B. Support of 0 ms handover
C. Support of asynchronous handover
D. Cell grouping (e.g., an Array or bitmap of 0/1 to group that indicates whether there is support for a list of possible cells)
E. Support of intra-frequency (e.g., if single band) handover (e.g., may assume a same bandwidth carrier between source and target base station)
F. Other band combination capabilities Signaling may be provided for each band combination supported by the UE. In the cell grouping, a value 0 indicates that the carriers of the corresponding band entry are mapped to a first cell group, while value 1 indicates that the carriers of the corresponding band entry are mapped to a second cell group.

The other band combination capabilities may be used to downgrade or limit the UE capabilities when determining a target base cell/target base station for handover. Band of BC capabilities indicates that particular capabilities are indicated for each of the N bands of the band combination. Limitations of capabilities on certain bands of the band combination may be used as a limit when determining a target base cell/target base station for handover.

A second option for signaling the UE capabilities to the source base station (or for signaling the UE's capabilities from the source base station to the target base station) may allow for band sharing, e.g., intra-band and inter-band handover. The cell grouping may be extended from 0/1 to 0/1/2. In the cell grouping, a value 0 indicates that the carriers of the corresponding band entry are mapped to a first cell group, while value 1 indicates that the carriers of the corresponding band entry are mapped to a second cell group, a value of 2 indicates that the band may belong to both cells for handover. For example, band sharing may be feasible for some but not all of the cell groups. An example signaling structure may include for a band combination (BC):

A. An array [N] of bands
   i. Bandwidth class
   ii. Capabilities for each BoBC
   iii. Support for inter-frequency handover in downlink
   iv. Support for intra-frequency handover in uplink B. Support of 0 ms handover
C. Support of asynchronous handover
D. Cell grouping (e.g., an Array or bitmap of 0/1/2 to group that indicates whether there is support for a list of possible cells)
E. Support of intra-frequency (e.g., if single band) handover (e.g., may assume a same bandwidth carrier between source and target base station)
F. Other band combination capabilities The difference in the second option is the indication of the support for inter-frequency handover for downlink (e.g., if the band may be shared) and intra-frequency handover for uplink (e.g., if the band may be shared). A cell grouping of "2" indicates that the band can be shared between a source and a target cell.

In another option, Band of BC parameters may be added to signal that a given band combination (e.g., regardless of cell grouping) can be shared. An example signaling structure may include for a band combination:

A. An array [N] of bands
   i. Bandwidth class
   ii. Capabilities for each BoBC
   iii. Support of band sharing
      1. Support of inter-frequency in DL/intra-frequency in UL B. Support of 0 ms handover
C. Support of asynchronous handover
D. Cell grouping (e.g., an Array or bitmap of 0/1 to group that indicates whether there is support for a list of possible cells)
F. Other band combination capabilities In another example, support may be indicated for multiple timing advance groups (TAGs), e.g., for intra-band and/or inter-band handover. An example signaling structure may include for a band combination:

A. An array [N] of bands
   i. Bandwidth class
   ii. Capabilities for each Band of BC
   iii. Support of band sharing
      1. Support of inter-frequency in DL/intra-frequency in UL
      2. Support of multiple TAGs For example, a multiple TAG field may indicate whether the UE supports multiple timing advances for each band combination indicated as being supported. If the band combination is comprised of more than one band entry (i.e., inter-band or intra-band non-contiguous band combination), the field may indicate that the same or different timing advances on different band entries are supported. If the band combination is comprised of one band entry (i.e., intra-band contiguous band combination), the field may indicate that the same or different timing advances across component carriers of the band entry are supported.

In another option, the UE capabilities may be signaled using aspects from any combination of the examples provided herein. An example signaling structure may include for a band combination:

A. An array [N] of bands
   i. Bandwidth class (e.g., which may be separately indicated for uplink and downlink)
   ii. Capabilities for each Band of BC
   iii. Switching time to other bands or other CC
   iv. Support of band sharing
      1. Support of inter-frequency in DL/intra-frequency in UL
      2. Support of multiple TAGs within a same band B. Support of 0 ms handover
C. Support of asynchronous handover
D. Cell grouping (e.g., an Array or bitmap of 0/1 to group that indicates whether there is support for a list of possible cells)
F. Other band combination capabilities In this example, a switching time may be indicated, e.g., the time for the UE to switch from one band or CC for the source/target base station to a different band/CC for the other of the source/target base station. The switching time may indicate a need for a TDM pattern for communication with the source and target base stations, e.g., to enable the UE to switch from one band to the other in order to communicate with both base stations during the handover procedure. If a band sharing capability is indicated, the cell grouping indications may be ignored.

The support for inter-frequency handover for downlink may be based on the band may be shared, and intra-frequency handover for uplink may be based on the band may be shared). The capability for band sharing in this option is indicated for Band of BC, e.g., rather than relying on the bitmap of 0/1/2 for cell grouping in the previous example. The cell grouping for this example may indicate cell grouping using 0/1. However, the indication may be ignored if the bands are shared.

At 605, UE 602 may communicate with source base station 604 over the established communication link, and source base station may configure UE measurement configuration through RRC Connection Reconfiguration procedure. The UE 602 and the source base station 604 may communicate bi-directionally via the communication link and utilize one or more frequency carriers for control and data transmission. In some implementations, the UE 602 may initiate periodic measurement of the active communication on the serving cell, as well as identified signaling corresponding to one or more alternative base stations (e.g., base station 606) providing communication coverage for one or more neighboring cells. In some cases, the UE 602 may measure reference signals from the source base station 604 and the target base station 606, along with other neighboring base stations on the supported one or more band combinations. In such cases, the source base station 604 may use information from the measured reference signals to identify the target base station 606, and may further use the information to determine whether the UE may be handed over to the target base station 606.

At 607, the UE 602 may transmit, and the source base station 604 may receive, an RRC measurement report based on the RRC reconfiguration request and measurement configuration. At some time, the UE 602 may experience degraded signal quality or power due to interference within a serving cell, or mobility at the UE 602 may increase signaling attenuation over a communication link particularly when operating at a boundary of a serving cell. The variation in signal quality or signal power may correspond to a measurement event and prompt the UE 602 to transmit measurement reporting to the source base station 604.

At 609, the source base station 604 may determine a new source base station configuration for the UE 602 based on the identified UE capability. The source base station configuration may in some cases be based on the current source base station configuration for the UE 602. The source base station 604 may determine the new source base station configuration based on which one or more band combinations are supported by the UE 602, and how one or more bands or band combinations may be allocated/split between the source base station 604 and the target base station 606. In some cases, the dual connectivity is maintained between each of the source base station 604 and the target base station 606 and the UE 602 during handover execution, and is maintained after handover execution until the communication with the source base station 604 is released. A handover that includes dual connectivity that is maintained between the source base station and the target base station during the handover may be referred to as a dual active protocol stack (DAPS) handover, for example.

At 611, based on the measurement report, the source base station 604 may identify one or more neighboring base stations and may transmit a handover request to a target base station 606. The handover request may include the received UE capability message, and the new source base station configuration for UE 602, dual active stack handover, asynchronous parameters, TDM pattern(s), power splitting, or the like.

At 613, the target base station 606 may receive the handover request and may determine a first target base station configuration for the UE 602 to apply during handover execution. In addition, in cases where the source base station 604 is released from communicating with the UE 602 after handover, the target base station 606 may determine a second target base station configuration for the UE 602 to apply after release of a connection with source base station 604. In some cases, the first and second target base station configurations may be based on the source base station configuration and the indicated UE capability (e.g., support for intra-frequency handover, inter-frequency intra-band handover, or intra-band handover, a number of supported CCs, whether asynchronous handover is supported for each band combination, whether a TDM pattern is needed or requested, support for multiple TAGs in a band, etc.).

At 615, the target base station 606 may transmit to the source base station 604 a response to the handover request (e.g., a handover request acknowledgement (ACK) or some other HARQ feedback response). In addition, the target base station 606 may transmit the first target base station configuration for the UE 602 to apply during handover execution. In some cases, a second target base station configuration may be transmitted that contains configuration information to be used in examples where the source base station 604 is released from communications at the UE 602. The target base station configuration may further include other information, such as a TDM pattern. The TDM pattern may indicate respective time periods in which the source and target base stations respectively transmits with the UE 602 for dual connectivity.

At 617, the source base station 604 may transmit an RRC reconfiguration request to the UE 602 to initiate handover of the UE 602 from the source base station 604 to the target base station 606. In some cases, the RRC reconfiguration request may include mobility control information. Such information may include the target base station configuration to apply during handover execution, the source base station configuration during handover execution to apply during handover execution. In addition, the RRC reconfiguration request may include the target base station configuration for cases where the source base station 604 is released from communication with the UE 602 after handover execution. The RRC reconfiguration request may also include other information, such as TDM pattern(s), asynchronous operation information, power splitting parameters, and so on.

At 619, the UE 602 may maintain a connection with the source base station 604, and may similarly maintain a connection with the target base station 606 (e.g., using the received configurations), after receiving the resource configuration request at 617. In addition, active data transfer (e.g., uplink and downlink data transfer from the UE 602 and the source base station 604 and target base station 606) may take place using a source cell stack associated with the source base station 604. In some examples, the UE 602 may maintain the source base station connection using the source base station configuration received in the resource configuration request and DL/UL data transfer is active using the source cell stack.

At 621, the UE 602 may transmit to the target base station 606, a message which indicates the completion of the handover procedure. In some cases, the message may be a RRC connection reconfiguration complete message.

At 623, the UE 602 may in some cases end or release a connection with source base station 604. In some examples, the UE 602 may receive an RRC message from the target base station 606 containing information to release the connection with the source base station 604. In some cases, the RRC message may include the target base station configuration based on a UE capability (e.g., full UE capability). In addition, the RRC message may contain information to release established TDM applied during dual connectivity. In some examples, the UE 602 may receive a MAC control element (CE) from the target base station 606 indicating to release the connection with the source base station 604. After releasing the connection with the source base station 604, the UE may change its configuration to the full target base station configuration, and may release use the TDM pattern applied during dual connectivity. In some examples the release of the connection at the source base station 604 after handover may be timer-based (e.g., timer based source base station release).

Figure 10:
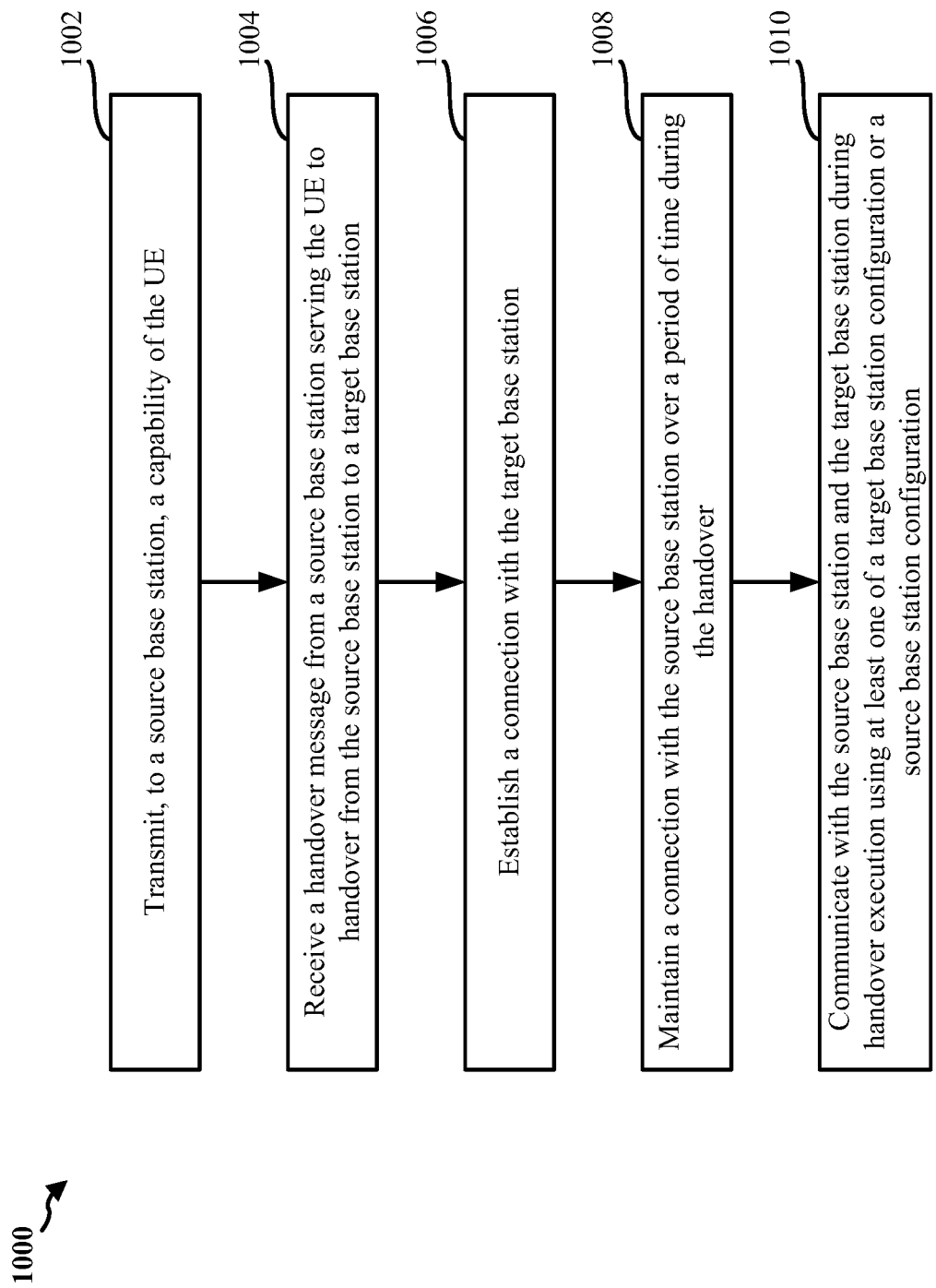
FIG. 10 is a flowchart of a method of wireless communication.

FIG. 10 is a flowchart 1000 of a method of wireless communication, as described in accordance with the teachings disclosed herein. The method may be performed by a UE or a component of a UE for communication based on sidelink (e.g., the UE 104, 350, 402, 602, the UE 1450, and/or the UE 1750, the apparatus 1102/1102', the processing system 1214, which may include the memory 360 and which may be the entire UE or a component of the UE, such as the TX processor 368, the RX processor 356, and/or the controller/processor 359).

At 1002, the UE transmits, to a source base station, a capability of the UE, as described in connection with, for example, FIG. 6. As discussed herein, the handover may be a handover in which the UE maintains dual connectivity to the source base station and the target base station during the handover procedure, e.g., such as described in connection with FIG. 4. Such a handover may be referred to as a DAPS handover or an eMBB handover. Thus, the capability may be a capability associated with the type of handover during which the UE maintains dual connectivity to the source and target base stations. For example, a capability component 1110 of the apparatus 1102/1102' may facilitate the transmitting of the capability of the UE to the source base station. In some examples, the capability of the UE transmitted to the source base station may include a UE capability for at least one of an inter-frequency handover, an intra-band and inter-frequency handover, and an inter-band handover. The capability may be indicated per band combination. In some examples, the capability of the UE transmitted to the source base station may include a UE capability for an intra-frequency handover. The capability may be associated with a bandwidth class, for example. In some examples, the capability of the UE transmitted to the source base station may include a number of supported CCs for an intra-band handover. In certain such examples, the capability may be indicated based on a CC bandwidth class. In some examples, the capability may include at least one of a maximum number of CCs that are supported by the UE for the intra-band handover or a maximum bandwidth supported by the UE for the intra-band handover. In some examples, the number of CCs may include overlapped CCs for intra-frequency handover. In some examples, supported uplink CCs may be indicated by a first bandwidth class, and supported downlink CCs may be indicated by a second bandwidth class. In some examples, the capability of the UE transmitted to the source base station may include at least one of support for synchronous handover for a synchronous source call and target cell or asynchronous handover for an asynchronous source cell and target cell. The capability may be indicated per band combination. In certain such examples, the capability may include an indication of whether the UE supports at least one of the asynchronous handover per hand combination and per band of band combination. In some examples, the capability may include an indication of whether the UE supports at least one of the synchronous handover per hand combination and per band of band combination. In some examples, the capability of the UE transmitted to the source base station may include a need or request for a TDM pattern. In some examples, the capability that is transmitted to the source base station comprises support for multiple TAGs within a band that is shared by the source base station and the target base station.

At 1004, the UE receives a handover message from a source base station serving the UE to handover from the source base station to a target base station, as described in connection with, for example, FIG. 5 and/or FIG. 6. For example, a handover message component 1120 of the apparatus 1102/1102' may facilitate the receiving of the handover message from the source base station serving the UE. In some examples, the handover message may include at least one of a target base station configuration to apply during handover execution or a source base station configuration to apply during handover execution based on the capability of the UE.

At 1006, the UE establishes a connection with the target base station, as described in connection with, for example, FIGS. 4, 5 and/or 6. For example, a connection establishing component 1130 of the apparatus 1102/1102' may facilitate the establishing of the connection with the target base station.

At 1008, the UE maintains a connection with the source base station over a period of time during the handover, as described in connection with, for example, FIGS. 4, 5 and/or 6. For example, a connection component 1140 of the apparatus 1102/1102' may facilitate the maintain of the connection with the source base station over the period of time during the handover.

At 1010, the UE communicates with the source base station and the target base station during handover execution using at least one of a target base station configuration or a source base station configuration, as described in connection with, for example, FIGS. 4, 5 and/or 6. For example, a communication component 1150 of the apparatus 1102/1102' may facilitate the communicating with the source base station and the target base station during the handover execution using at least one of the target base station configuration or the source base station configuration.

Figure 11:
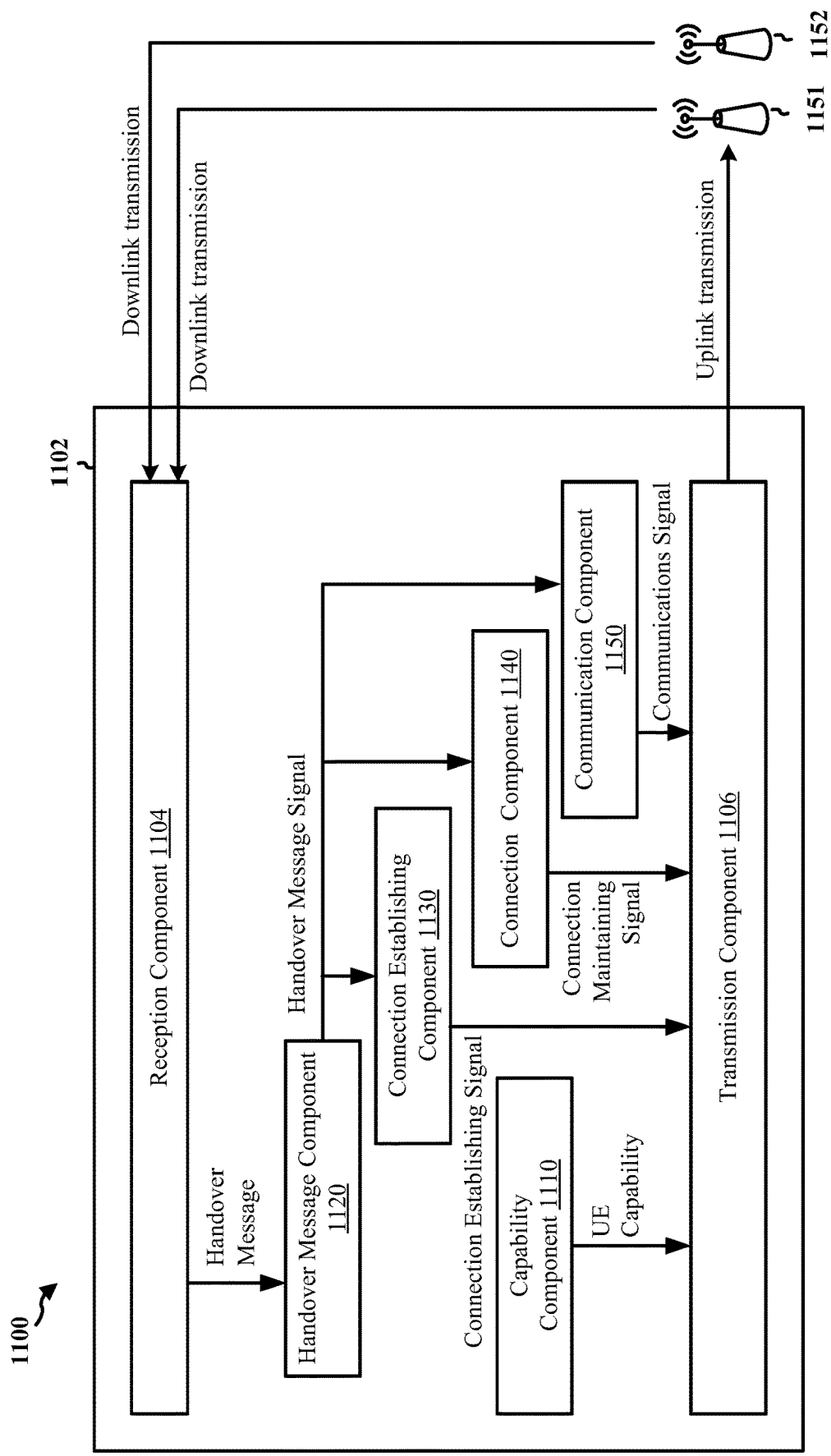
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE or a component of a UE. The apparatus includes a reception component 1104, a transmission component 1106, a capability component 1110, a handover message component 1120, a connection establishing component 1130, a connection component 1140, and a communication component 1150.

The apparatus includes the reception component 1104 configured to receive communications from a source base station 1151 and/or a target base station 1152.

The apparatus includes the transmission component 1106 configured to transmit communications to the source base station 1151 and/or the target base station 1152.

The apparatus includes the capability component 1110 configured to transmit, to the source base station 1151, a capability of the UE, e.g., as described in connection with 1002 of FIG. 10.

The apparatus includes the handover message component 1120 configured to receive a handover message from the source base station 1151 to the target base station 1152, e.g., as described in connection with 1002 of FIG. 10. In some examples, the handover message may include at least one of a target base station configuration to apply during handover execution or a source base station configuration to apply during handover execution based on the capability of the UE.

The apparatus includes the connection establishing component 1130 configured to establish a connection with the target base station 1152, e.g., as described in connection with 1002 of FIG. 10.

The apparatus includes the connection component 1140 configured to maintain a connection with the source base station 1151 over a period of time during the handover, e.g., as described in connection with 1002 of FIG. 10.

The apparatus includes the communication component 1150 configured to communicate with the source base station 1151 and the target base station 1152 during handover execution using at least one of the target base station configuration or the source base station configuration, e.g., as described in connection with 1002 of FIG. 10.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
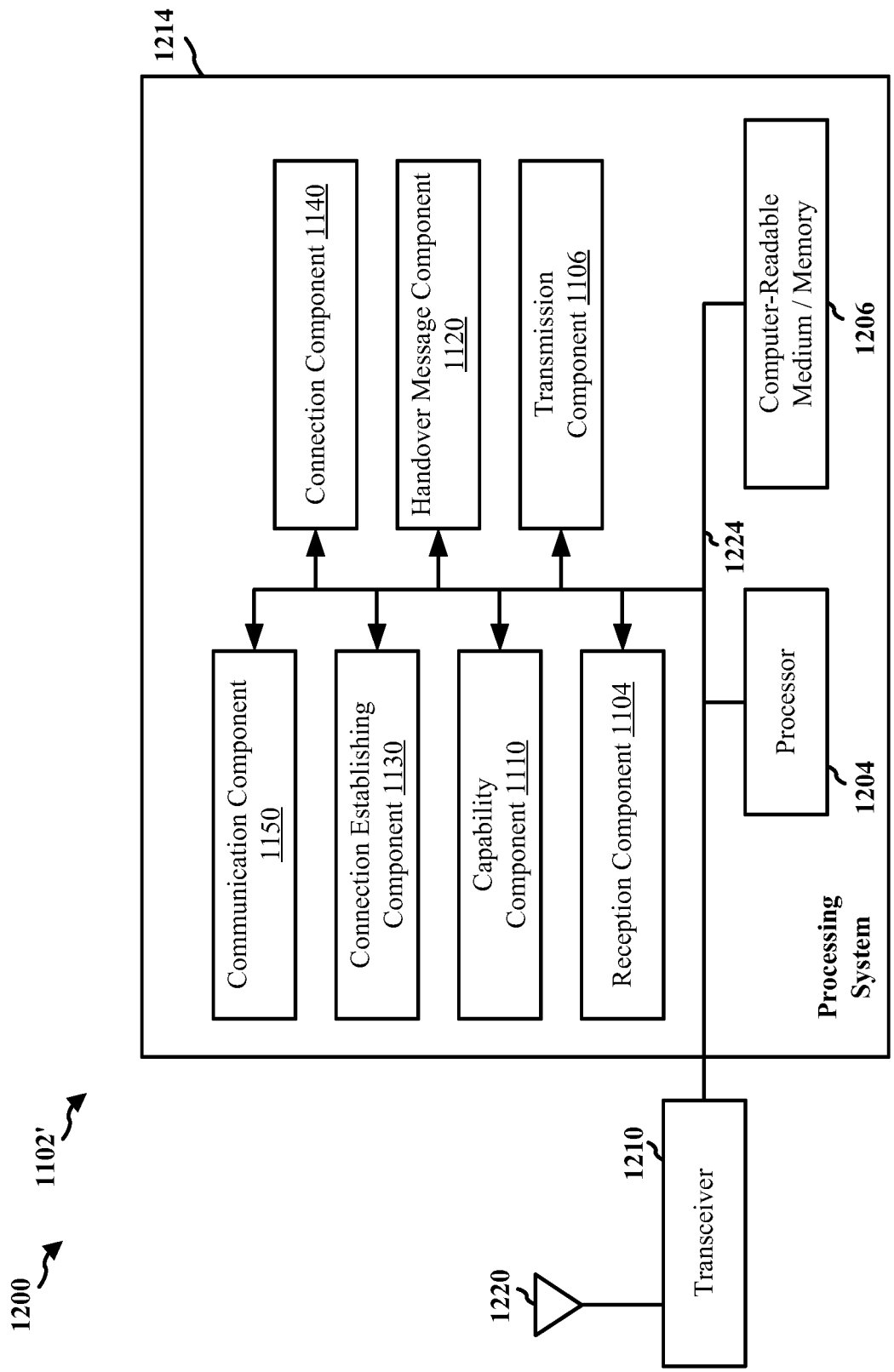
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1110, 1120, 1130, 1140, 1150, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1110, 1120, 1130, 1140, 1150. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see the UE 350 of FIG. 3).

In one configuration, the apparatus 1102/1102' for wireless communication includes means for transmitting, to a source base station, a capability of the UE. The apparatus may include means for receiving a handover message from a source base station serving the UE to handover from the source base station to a target base station. In some examples, the handover message may include at least one of a target base station configuration to apply during handover execution or a source base station configuration to apply during handover execution based on the capability of the UE. The apparatus may include means for establishing a connection with the target base station. The apparatus may include means for maintaining a connection with the source base station over a period of time during the handover. The apparatus may include means for communicating with the source base station and the target base station during handover execution using at least one of the target base station configuration or the source base station configuration. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
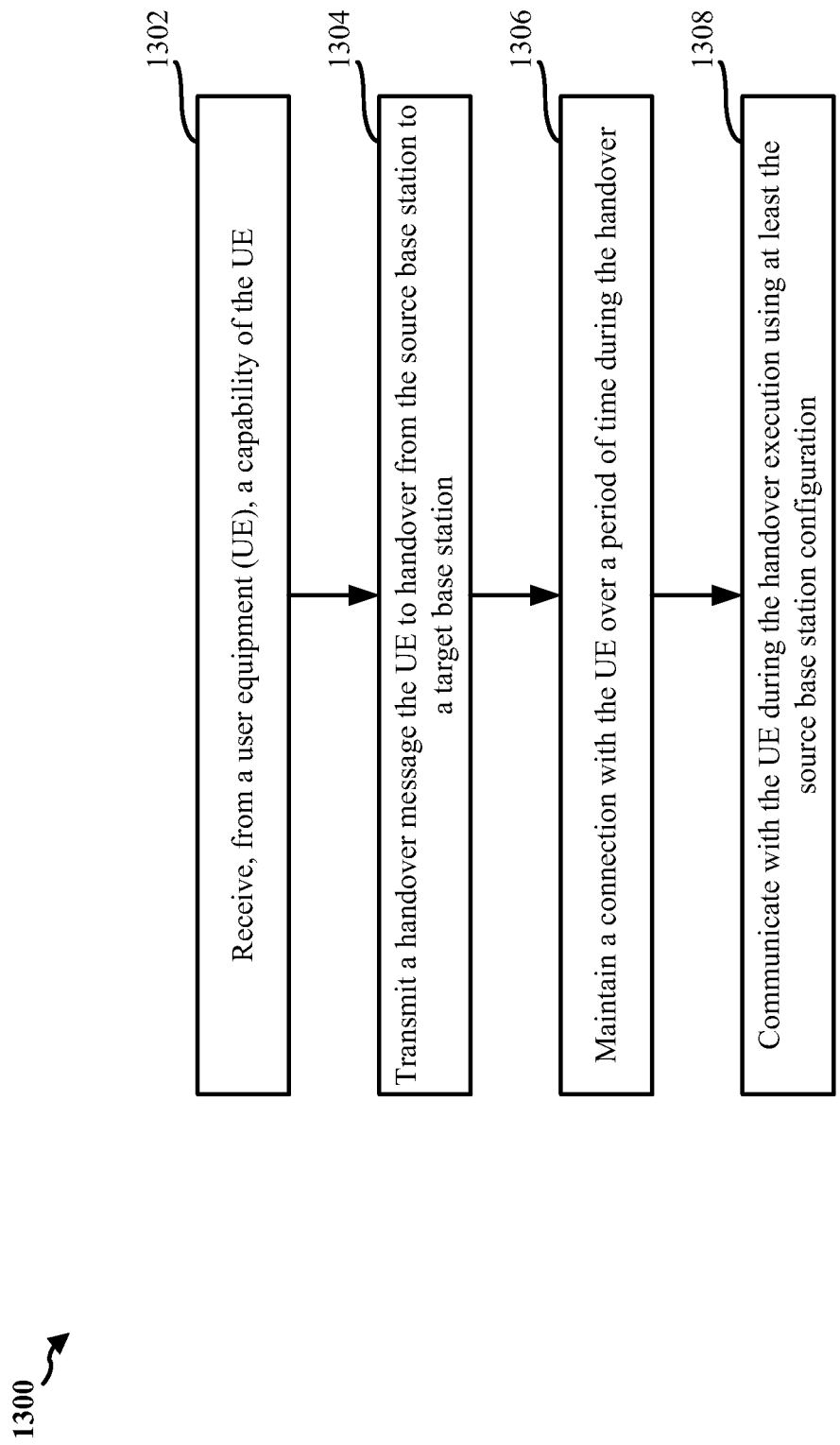
FIG. 13 is a flowchart of a method of wireless communication.

FIG. 13 is a flowchart 1300 of a method of wireless communication, as described in accordance with the teachings disclosed herein. The method may be performed by a source base station or a component of a source base station for communication (e.g., 102, 180, 310, the source base station 404, 604, 1151, 1752; the apparatus 1302/1302'; the processing system 1514, which may include the memory 376 and which may be the entire base station or a component of the base station, such as the TX processor 316, the RX processor 370, and/or the controller/processor 375).

At 1302, the source base station receives, from a UE, a capability of the UE, as described in connection with, for example FIG. 6. As discussed herein, the handover may be a handover in which the UE maintains dual connectivity to the source base station and the target base station during the handover procedure, e.g., such as described in connection with FIG. 4. Such a handover may be referred to as a DAPS handover or an eMBB handover. Thus, the capability may be a capability associated with the type of handover during which the UE maintains dual connectivity to the source and target base stations. For example, a capability component 1410 of the apparatus 1402/1402' may facilitate the receiving of the capability of the UE from the UE. In some examples, the capability that is received from the UE may include a UE capability for at least one of an inter-frequency handover, an intra-band and inter-frequency handover, and an inter-band handover. The capability may be indicated per band combination. In some examples, the capability that is received from the UE may include a UE capability for an intra-frequency handover. The capability may be associated with a bandwidth class, for example. In some examples, the capability that is received from the UE may include a number of supported CCs for an intra-band handover. In certain such examples, the capability may be indicated based on a CA bandwidth class. In some examples, the capability may include at least one of a maximum number of CCs that are supported by the UE for the intra-band handover or a maximum bandwidth supported by the UE for the intra-band handover. In some examples, the number of CCs may include overlapped CCs for intra-frequency handover. In some examples, supported uplink CCs may be indicated by a first bandwidth class, and supported downlink CCs may be indicated by a second bandwidth class. In some examples, the capability that is received from the UE may include at least one of support for synchronous handover for a synchronous source cell and target cell or asynchronous handover for an asynchronous source cell and target cell. The capability may be indicated per band combination. In some examples, the capability that is received from the UE may include an indication of whether the UE supports at least one of the asynchronous handover per band combination and per band of band combination. In some examples, the capability that is received from the UE may include an indication of whether the UE supports at least one of the synchronous handover per band combination and per band of band combination. In some examples, the capability of the UE that is received from the UE may include a need for a TDM pattern. In some examples, the capability that is received from the UE comprises support for multiple TAGs within a band that is shared by the source base station and the target base station.

At 1304, the source base station transmits a handover message to the UE to handover from the source base station to a target base station as described in connection with, for example, FIGS. 5 and/or 6. For example, a handover message component 1420 of the apparatus 1402/1402' may facilitate the transmitting of the handover message to the UE to handover from the source base station to the target base station. In some examples, the handover message may include at least one of a target base station configuration to apply during handover execution or a source base station configuration to apply during handover execution based on the capability of the UE.

At 1306, the source base station maintains a connection with the UE over a period of time during the handover, as described in connection with, for example, FIGS. 4, 5 and/or 6. For example, a connection component 1430 of the apparatus 1402/1402' may facilitate the maintain of the connection with the UE over the period of time during the handover.

At 1308, the source base station communicates with the UE during the handover execution using at least the source base station configuration as described in connection with, for example, FIGS. 4, 5 and/or 6. For example, a communication component 1440 of the apparatus 1402/1402' may facilitate the communicating with the UE during the handover executing using at least the source base station configuration.

Figure 14:
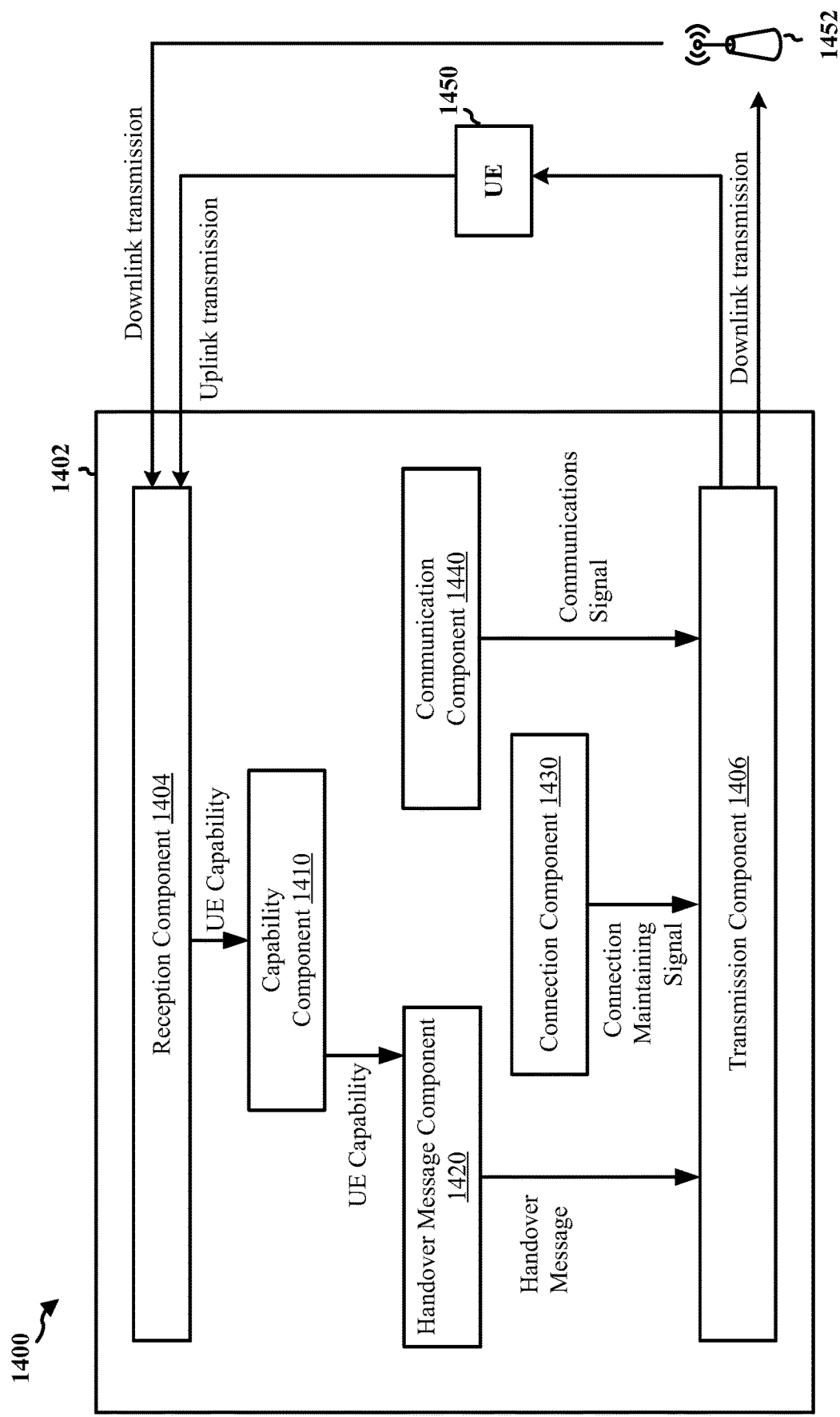
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a base station or a component of a base station. The apparatus includes a reception component 1404, a transmission component 1406, a capability component 1410, a handover message component 1420, a connection component 1430, and a communication component 1440.

The apparatus includes the reception component 1404 configured to receive communications from a UE 1450 and/or a target base station 1452.

The apparatus includes the transmission component 1406 configured to transmit communications to the UE 1450 and/or the target base station 1452.

The apparatus includes the capability component 1410 configured to receive, from the UE 1450, a capability of the UE, e.g., as described in connection with 1302 of FIG. 13.

The apparatus includes the handover message component 1420 configured to transmit a handover message to the UE 1450 to handover from the source base station to the target base station 1452. In some examples, the handover message may include at least one of a target base station configuration to apply during handover execution or a source base station configuration to apply during handover execution based on the capability of the UE, e.g., as described in connection with 1304 of FIG. 13.

The apparatus may include the connection component 1430 configured to maintain a connection with the UE 1450 over a period of time during the handover, e.g., as described in connection with 1306 of FIG. 13.

The apparatus may include the communication component 1440 configured to communicate with the UE 1450 during the handover execution using at least the source base station configuration, e.g., as described in connection with 1308 of FIG. 13.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
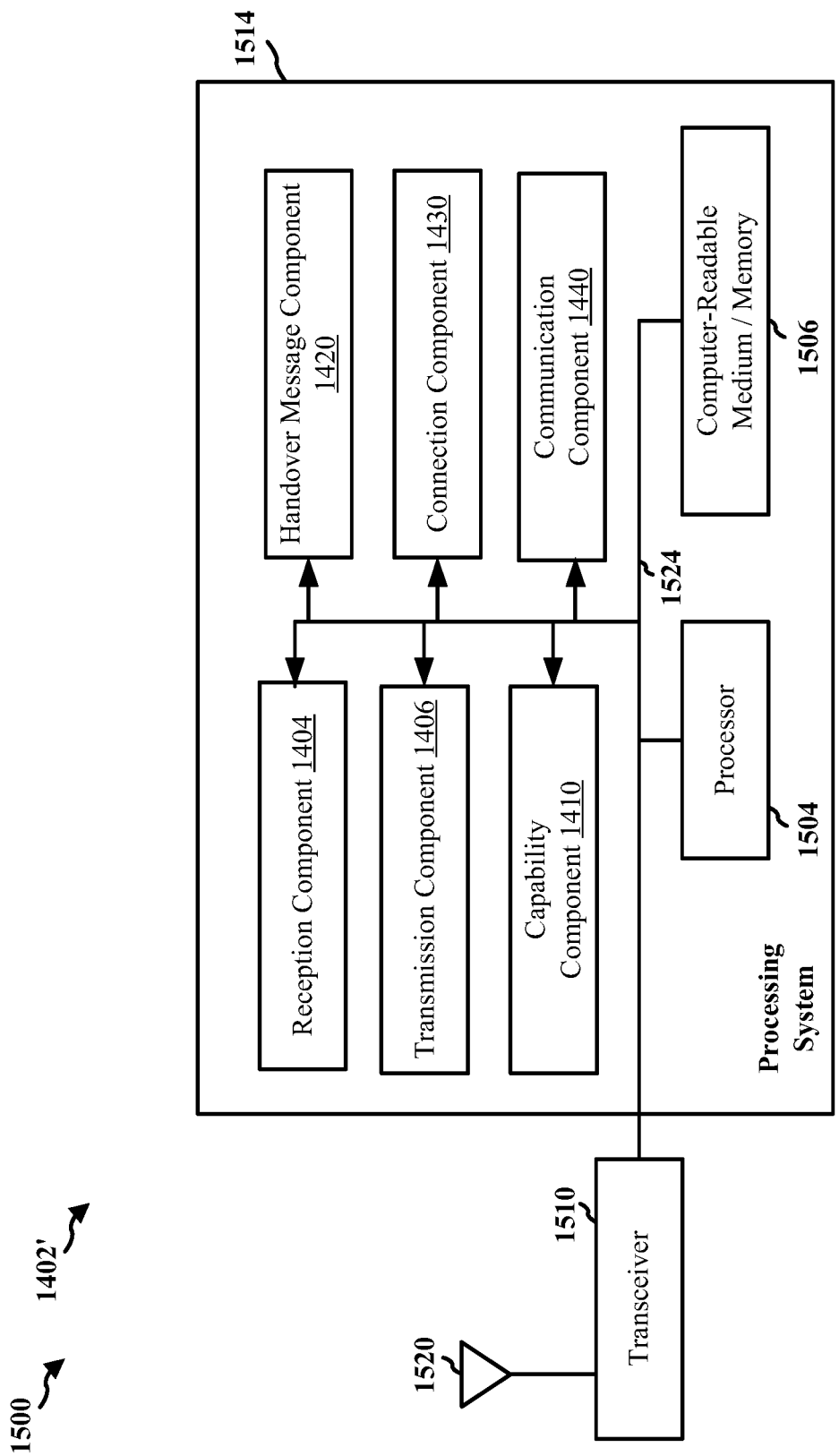
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1410, 1420, 1430, 1440, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1410, 1420, 1430, 1440. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see the base station 310 of FIG. 3).

In one configuration, the apparatus 1402/1402' for wireless communication includes means for receiving, from a UE, a capability of the UE. The apparatus may include means for transmitting a handover message to the UE to handover from the source base station to a target base station, wherein the handover message comprises at least one of a target base station configuration to apply during handover execution or a source base station configuration to apply during handover execution based on the capability of the UE. The apparatus may include means for maintaining a connection with the UE over a period of time during the handover. The apparatus may include means for communicating with the UE during the handover execution using at least the source base station configuration. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
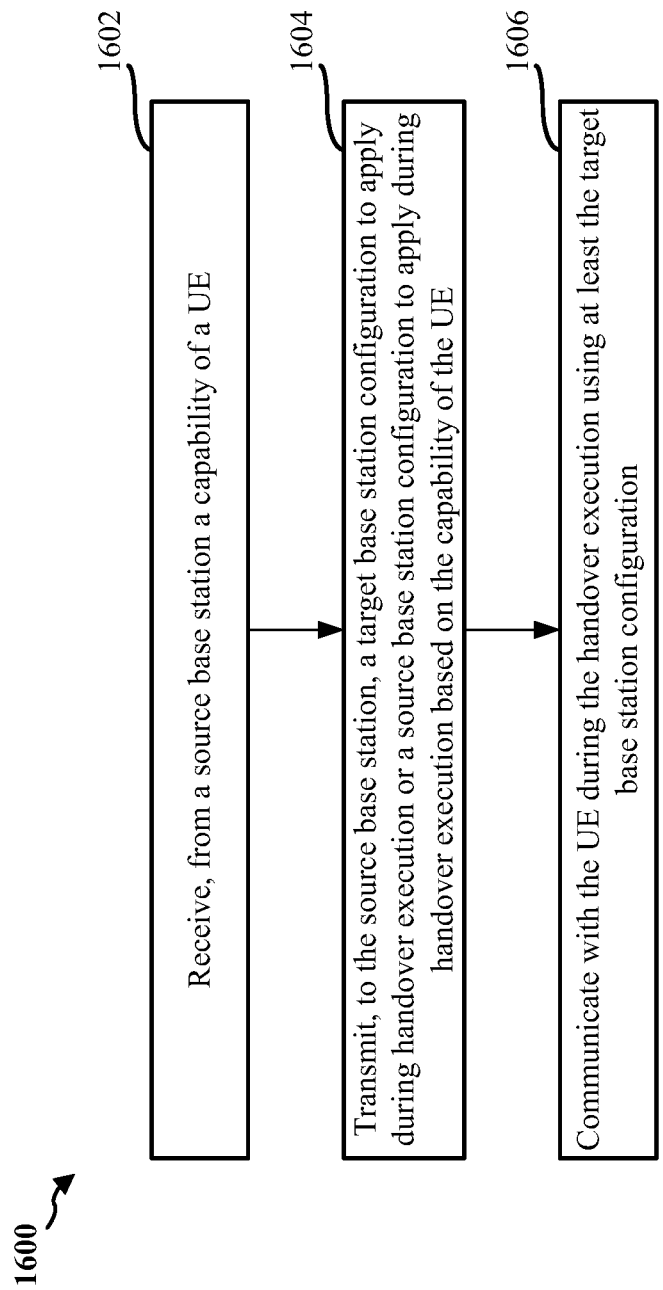
FIG. 16 is a flowchart of a method of wireless communication.

FIG. 16 is a flowchart 1600 of a method of wireless communication, as described in accordance with the teachings disclosed herein. The method may be performed by a target base station or a component of a target base station for communication (e.g., the 102, 180, 310; the target base station 408, 606, 1152,1452; the apparatus 1702/1702'; the processing system 1814, which may include the memory 376 and which may be the entire base station or a component of the base station, such as the TX processor 316, the RX processor 370, and/or the controller/processor 375).

At 1602, the target base station receives, from a source base station, a capability of a UE, as described in connection with, for example FIG. 6. For example, a capability component 1710 of the apparatus 1702/1702' may facilitate the receiving of the capability of the UE from the source base station. In some examples, the capability of the UE that is received from the source base station may include a UE capability for at least one of an inter-frequency handover, an intra-band and inter-frequency handover, and an inter-band handover. The capability may be indicated per band combination. As discussed herein, the handover may be a handover in which the UE maintains dual connectivity to the source base station and the target base station during the handover procedure, e.g., such as described in connection with FIG. 4. Such a handover may be referred to as a DAPS handover or an eMBB handover. In some examples, the capability of the UE that is received from the source base station may include a UE capability for an intra-frequency handover. The capability may be associated with a bandwidth class, for example. In some examples, the capability of the UE that is received from the source base station may include a number of supported CCs for an intra-band handover. In certain such examples, the capability may be indicated based on a CA bandwidth class. In some examples, the capability may include at least one of a maximum number of CCs that are supported by the UE for the intra-band handover or a maximum bandwidth supported by the UE for the intra-band handover. In some examples, the number of CCs may include overlapped CCs for intra-frequency handover. In some examples, supported uplink CCs may be indicated by a first bandwidth class, and supported downlink CCs may be indicated by a second bandwidth class. In some examples, the capability of the UE that is received from the source base station may include at least one of support for synchronous handover for a synchronous source cell and target cell or asynchronous handover for an asynchronous source cell and target cell. The capability may be indicated per band combination. In some examples, the capability of the UE that is received from the source base station may include an indication of whether the UE supports at least one of the asynchronous handover per band combination and per band of band combination. In some examples, the capability that is received from the UE may include an indication of whether the UE supports at least one of the synchronous handover per band combination and per band of band combination. In some examples, the capability of the UE that is received from the source base station may include a need or request for a TDM pattern. In some examples, the capability that is received from the source base station comprises support for multiple TAGs within a band that is shared by the source base station and the target base station.

At 1604, the target base station transmits, to the source base station, a target base station configuration to apply during handover execution or a source base station configuration to apply during handover execution based on the capability of the UE, as described in connection with, for example FIG. 6. For example, a target base station configuration component 1720 of the apparatus 1702/1702' may facilitate the transmitting of the target base station configuration to be applied during handover execution or a source base station configuration to be applied during handover execution based on the capability of the UE.

At 1606, the target base station communicates with the UE during the handover execution using at least the target base station configuration, as described in connection with, for example, FIGS. 4, 5 and/or 6. For example, a communication component 1730 of the apparatus 1702/1702' may facilitate the communicating with the UE during the handover execution using at least the target base station configuration.

Figure 17:
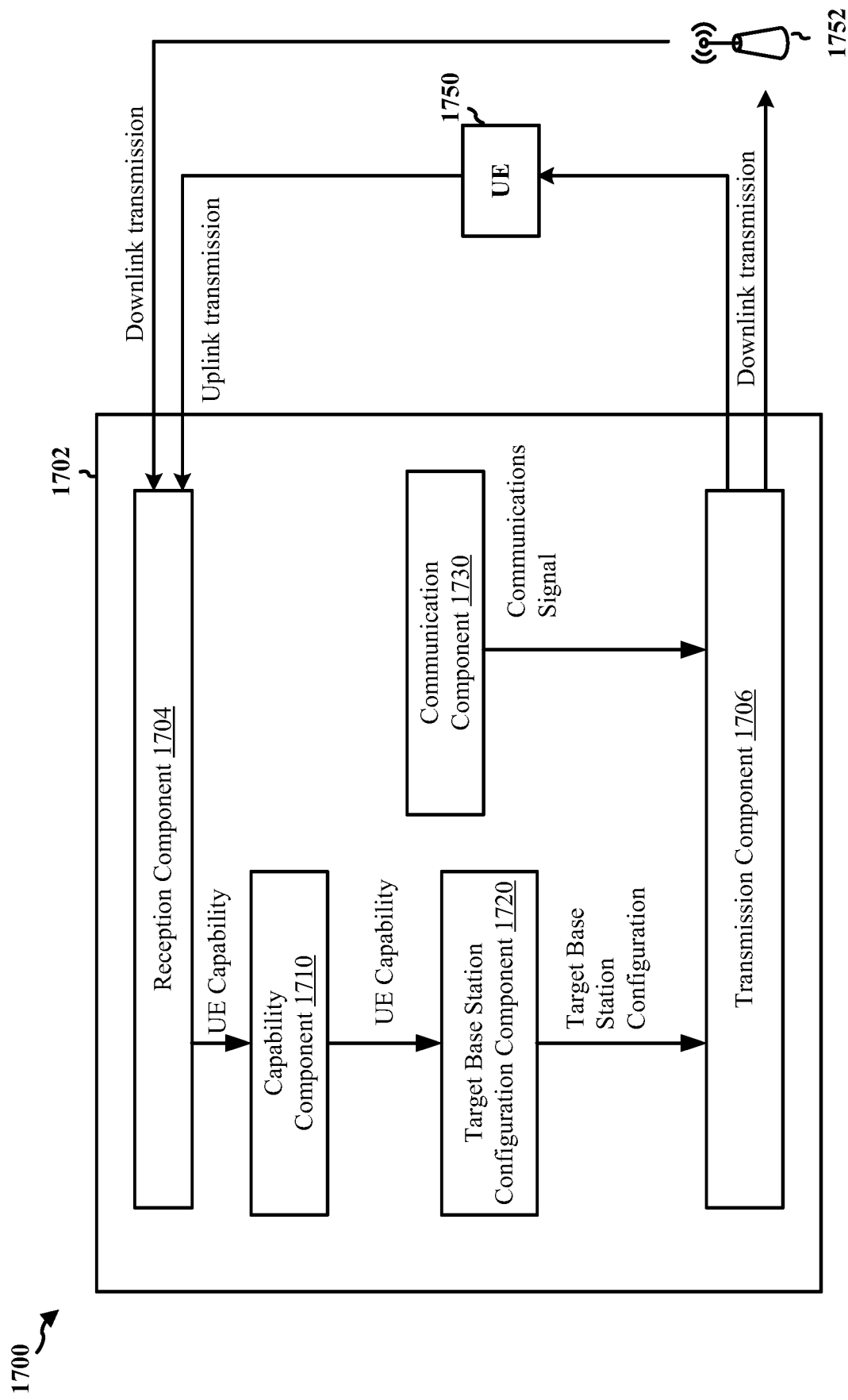
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus may be a base station or a component of a base station. The apparatus includes a reception component 1704, a transmission component 1706, a capability component 1710, a target base station configuration component 1720, and a communication component 1730.

The apparatus includes the reception component 1704 configured to receive communications from a UE 1750 and/or a source base station 1752.

The apparatus includes the transmission component 1706 configured to transmit communications to the UE 1750 and/or the source base station 1752.

The apparatus includes the capability component 1710 configured to receive, from the source base station 1752, a capability of the UE 1750, e.g., as described in connection with 1602 of FIG. 16.

The apparatus includes the target base station configuration component 1720 configured to transmit, to the source base station 1752, a target base station configuration to apply during handover execution or a source base station configuration to apply during handover execution based on the capability of the UE, e.g., as described in connection with 1604 of FIG. 16.

The apparatus includes the communication component 1730 configured to communicate with the UE 1750 during the handover execution using at least the target base station configuration, e.g., as described in connection with 1606 of FIG. 16.

The apparatus may include additional components that perform each of the blocks of the algorithm in the aforementioned flowcharts of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
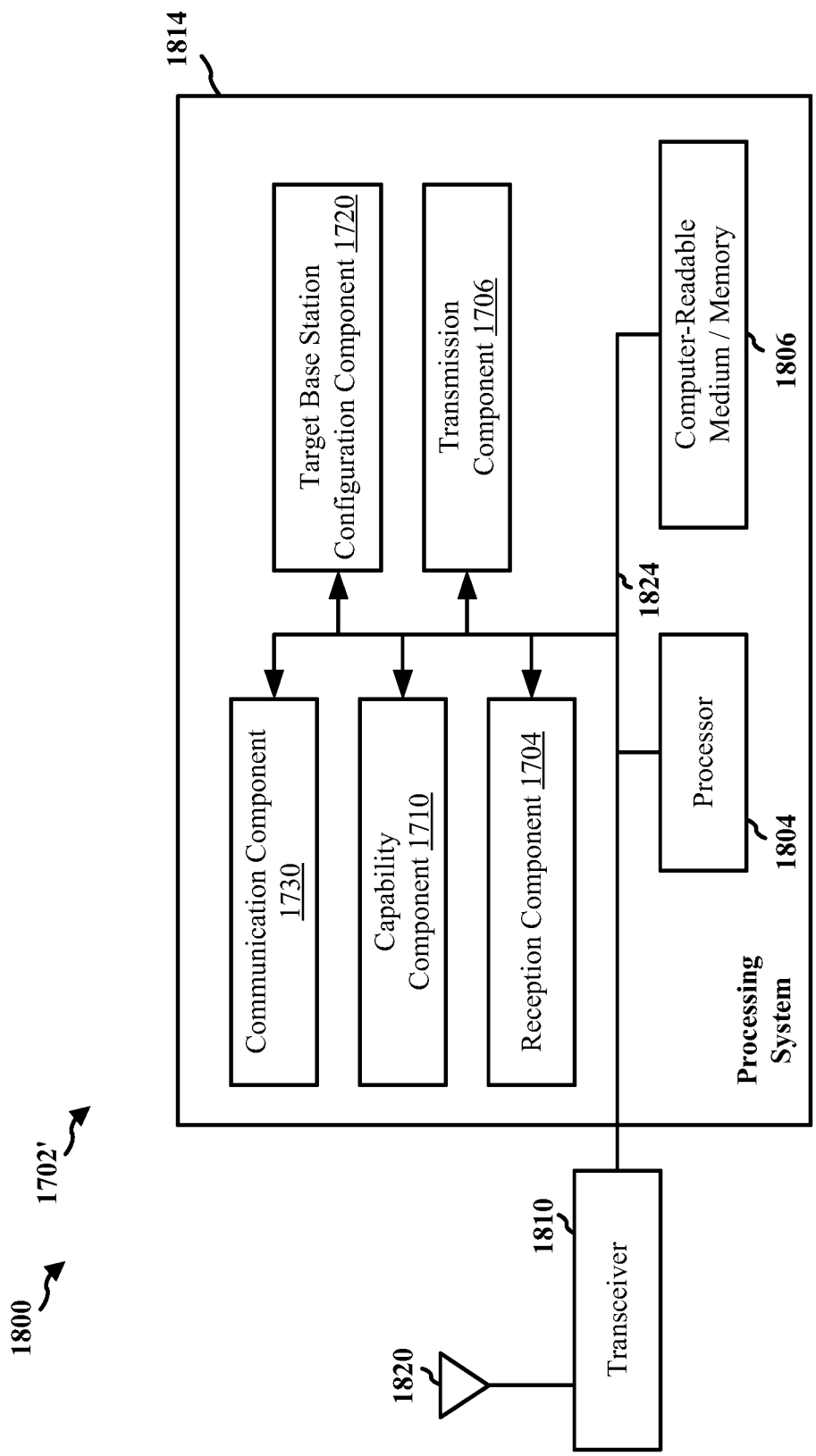
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1710, 1720, 1730, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1710, 1720, 1730. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375. Alternatively, the processing system 1814 may be the entire base station (e.g., see the base station 310 of FIG. 3).

In one configuration, the apparatus 1702/1702' for wireless communication includes means for receiving, from a source base station, a capability of a UE. The apparatus may include means for transmitting, to the source base station, a target base station configuration to apply during handover execution or a source base station configuration to apply during handover execution based on the capability of the UE. The apparatus may include means for communicating with the UE during the handover execution using at least the target base station configuration. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects of the following examples may be combined with aspects of other embodiments or teachings described herein, without limitation.

Example 1 is a method of wireless communications by a UE, comprising: transmitting, to a source base station, a capability of the UE associated with a bandwidth class or a band combination, the capability being associated with a handover in which the UE maintains connections with the source base station and a target base station; receiving a handover message from a source base station serving the UE to handover from the source base station to a target base station, wherein the handover message comprises at least one of a target base station configuration to apply during handover execution or a source base station configuration to apply during handover execution based on the capability of the UE; establishing a connection with the target base station; maintaining a connection with the source base station over a period of time during the handover; and communicating with the source base station and the target base station during handover execution using at least one of the target base station configuration or the source base station configuration.

In Example 2, the method of Example 1 further includes that the capability of the UE that is transmitted to the source base station comprises a UE capability for at least one of an inter-frequency handover, an intra-band and inter-frequency handover, and an inter-band handover, and wherein the capability is associated with the band combination. In Example 3, the method of any of Example 1 or Example 2 further includes that the capability of the UE that is transmitted to the source base station comprises a UE capability for an intra-frequency handover in which the UE maintains connections with the source base station and a target base station, and wherein the capability is associated with the bandwidth class. In Example 4, the method of any of Example 1 to Example 3 further includes that the capability of the UE that is transmitted to the source base station comprises a number of supported CCs for an intra-band handover. In Example 5, the method of any of Example 1 to Example 4 further includes that the capability is indicated based on a CA bandwidth class. In Example 6, the method of any of Example 1 to Example 5 further includes that the capability comprises at least one of a maximum number of CCs that are supported by the UE for the intra-band handover or a maximum bandwidth supported by the UE for the intra-band handover. In Example 7, the method of any of Example 1 to Example 6 further includes that the number of CCs includes overlapped CCs for intra-frequency handover. In Example 8, the method of any of Example 1 to Example 7 further includes that supported UL component carriers are indicated by a first bandwidth class, and supported DL component carriers are indicated by a second bandwidth class. In Example 9, the method of any of Example 1 to Example 8 further includes that the capability of the UE that is transmitted to the source base station comprises at least one of support for synchronous handover for a synchronous source cell and target cell or asynchronous handover for an asynchronous source cell and target cell, wherein the capability is indicated per band combination. In Example 10, the method of any of Example 1 to Example 9 further includes that the capability of the UE that is transmitted to the source base station comprises an indication of whether the UE supports at least one of the asynchronous handover per band combination and per band of band combination. In Example 11, the method of any of Example 1 to Example 10 further includes that the capability of the UE that is transmitted to the source base station comprises an indication of whether the UE supports at least one of the synchronous handover per band combination and per band of band combination. In Example 12, the method of any of Example 1 to Example 11 further includes that the capability of the UE that is transmitted to the source base station comprises a need for a TDM pattern. In Example 13, the method of any of Example 1 to Example 12 further includes the capability that is transmitted to the source base station comprises support for multiple TAGs within a band that is shared by the source base station and the target base station.

Example 14 is a system or apparatus including means for implementing a method or realizing an apparatus as in any of Examples 1 to 13. Example 15 is a device including one or more processors and one or more memories in electronic communication with the one or more processors storing instructions executable by the one or more processors to cause a system or an apparatus to implement a method as in any of Examples 1 to 13. Example 16 is a computer-readable medium storing instructions executable by one or more processors to cause the one or more processors to implement a method as in any of Examples 1 to 13.

Example 17 is a method for wireless communications by a source base station, comprising: receiving, from a UE, a capability of the UE associated with a bandwidth class or a band combination, the capability being associated with a handover in which the UE maintains connections with the source base station and a target base station; transmitting a handover message to the UE to handover from the source base station to a target base station, wherein the handover message comprises at least one of a target base station configuration to apply during handover execution or a source base station configuration to apply during handover execution based on the capability of the UE; maintaining a connection with the UE over a period of time during the handover; and communicating with the UE during the handover execution using at least the source base station configuration.

In Example 18, the method of Example 17 further includes that the capability that is received from the UE comprises a UE capability for at least one of an inter-frequency handover, an intra-band and inter-frequency handover, and an inter-band handover, and wherein the capability is associated with the band combination. In Example 19, the method of any of Example 17 or Example 18 further includes that the capability that is received from the UE comprises a UE capability for an intra-frequency handover in which the UE maintains connections with the source base station and a target base station, and wherein the capability is associated with the bandwidth class. In Example 20, the method of any of Example 17 to Example 19 further includes that the capability that is received from the UE comprises a number of supported CCs for an intra-band handover. In Example 21, the method of any of Example 17 to Example 20 further includes that the capability is indicated based on a CA bandwidth class. In Example 22, the method of any of Example 17 to Example 21 further includes that the capability comprises at least one of a maximum number of CCs that are supported by the UE for the intra-band handover or a maximum bandwidth supported by the UE for the intra-band handover. In Example 23, the method of any of Example 17 to Example 22 further includes that the number of CCs includes overlapped CCs for intra-frequency handover. In Example 24, the method of any of Example 17 to Example 23 further includes that supported uplink CCs are indicated by a first bandwidth class, and supported downlink CCs are indicated by a second bandwidth class. In Example 25, the method of any of Example 17 to Example 24 further includes that the capability that is received from the UE comprises at least one of support for synchronous handover for a synchronous source cell and target cell or asynchronous handover for an asynchronous source cell and target cell, wherein the capability is indicated per band combination. In Example 26, the method of any of Example 17 to Example 25 further includes that the capability that is received from the UE comprises an indication of whether the UE supports at least one of the asynchronous handover per band combination and per band of band combination. In Example 27, the method of any of Example 17 to Example 26 further includes that the capability of the UE that is transmitted to the source base station comprises an indication of whether the UE supports at least one of the synchronous handover per band combination and per band of band combination. In Example 28, the method of any of Example 17 to Example 27 further includes that the capability of the UE that is received from the UE comprises a need for a TDM pattern. In Example 29, the method of any of Example 17 to Example 28 further includes that the capability that is received from the UE comprises support for multiple TAGs within a band that is shared by the source base station and the target base station. Example 30 is a system or apparatus including means for implementing a method or realizing an apparatus as in any of Examples 17 to 29. Example 31 is a device including one or more processors and one or more memories in electronic communication with the one or more processors storing instructions executable by the one or more processors to cause a system or an apparatus to implement a method as in any of Examples 17 to 29. Example 32 is a computer-readable medium storing instructions executable by one or more processors to cause the one or more processors to implement a method as in any of Examples 17 to 29.

Example 33 is a method for wireless communications by a target base station, comprising: receiving, from a source base station, a capability of a UE associated with a bandwidth class or a band combination, the capability being associated with a handover in which the UE maintains connections with the source base station and a target base station; transmitting, to the source base station, a target base station configuration to apply during handover execution or a source base station configuration to apply during handover execution based on the capability of the UE; and communicating with the UE during the handover execution using at least the target base station configuration.

In Example 34, the method of Example 33 further includes that the capability that is received from the source base station comprises a UE capability for at least one of an inter-frequency handover, an intra-band and inter-frequency handover, and an inter-band handover, and wherein the capability is associated with the band combination. In Example 35, the method of Example 33 or Example 34 further includes that the capability that is received from the source base station comprises a UE capability for an intra-frequency handover in which the UE maintains connections with the source base station and a target base station, and wherein the capability is associated with the bandwidth class. In Example 36, the method of any of Example 33 to Example 35 further includes that the capability that is received from the source base station comprises a number of supported CCs for an intra-band handover. In Example 37, the method of any of Example 33 to Example 36 further includes that the capability is indicated based on a CA bandwidth class. In Example 38, the method of any of Example 33 to Example 37 further includes that the capability comprises at least one of a maximum number of CCs that are supported by the UE for the intra-band handover or a maximum bandwidth supported by the UE for the intra-band handover. In Example 39, the method of any of Example 33 to Example 38 further includes that the number of CCs includes overlapped CCs for intra-frequency handover. In Example 40, the method of any of Example 33 to Example 39 further includes that supported UL component carriers are indicated by a first bandwidth class, and supported DL component carriers are indicated by a second bandwidth class. In Example 41, the method of any of Example 33 to Example 40 further includes that the capability that is received from the source base station comprises at least one of support for synchronous handover for a synchronous source cell and target cell or asynchronous handover for an asynchronous source cell and target cell, wherein the capability is indicated per band combination. In Example 42, the method of any of Example 33 to Example 41 further includes that the capability that is received from the source base station comprises an indication of whether the UE supports at least one of the asynchronous handover per band combination and per band of band combination. In Example 43, the method of any of Example 33 to Example 42 further includes that the capability that is received from the source base station comprises an indication of whether the UE supports at least one of the synchronous handover per band combination and per band of band combination. In Example 44, the method of any of Example 33 to Example 43 further includes that the capability that is received from the source base station comprises a need for a TDM pattern. In Example 45, the method of any of Example 33 to Example 44 further includes that the capability that is received from the source base station comprises support for multiple TAGs within a band that is shared by the source base station and the target base station. Example 46 is a system or apparatus including means for implementing a method or realizing an apparatus as in any of Examples 33 to 45.

Example 47 is a device including one or more processors and one or more memories in electronic communication with the one or more processors storing instructions executable by the one or more processors to cause a system or an apparatus to implement a method as in any of Examples 33 to 45.

Example 48 is a non-transitory computer-readable medium storing instructions executable by one or more processors to cause the one or more processors to implement a method as in any of Examples 33 to 45.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communications by a user equipment (UE), comprising:

transmitting, to a source base station, a capability of the UE associated with a bandwidth class or a band combination, the capability being for a type of a handover in which the UE maintains connections with the source base station and a target base station and supports overlapping data communication that overlap in time with the source base station and the target base station in the bandwidth class or with the band combination during the handover;

receiving a handover message from the source base station serving the UE to handover from the source base station to the target base station, wherein the handover message comprises at least one of a target base station configuration to apply during handover execution or a source base station configuration to apply during the handover execution based on the capability of the UE associated with the bandwidth class or the band combination for the handover;
establishing a first connection with the target base station;
maintaining a second connection with the source base station over a period of time during the handover; and
communicating with the source base station and the target base station during the handover execution using at least one of the target base station configuration or the source base station configuration.

2. The method of claim 1, wherein transmitting the capability of the UE includes indicating support for a UE capability for at least one of an inter-frequency handover, an intra-band and inter-frequency handover, and an inter-band handover involving, the band combination.

3. The method of claim 1, wherein transmitting the capability of the UE includes indicating support for a UE capability for an intra-frequency handover in which the UE maintains the connections with the source base station and the target base station in the bandwidth class.

4. The method of claim 1, wherein the capability of the UE that is transmitted to the source base station comprises a number of supported component carriers (CCs) for an intra-band handover.

5. The method of claim 4, wherein the capability indicates at least one of:
the capability indicated based on a carrier aggregation (CA) bandwidth class,
a maximum number of CCs that are supported by the UE for the intra-band handover,
a maximum bandwidth supported by the UE for the intra-band handover,
a number of CCs that includes overlapped CCs for intra-frequency handover, supported uplink component carriers that are indicated by a first bandwidth class, or
supported downlink component carriers that are indicated by a second bandwidth class.

6. The method of claim 1, wherein transmitting the capability of the UE includes indicating support for at least one of a synchronous handover for a synchronous source cell and target cell or asynchronous handover for an asynchronous source cell and target cell, wherein the capability is indicated per band combination.

7. The method of claim 6, wherein the capability of the UE that is transmitted to the source base station comprises an indication that the UE supports at least one of the synchronous handover per band combination and per band of a respective band combination.

8. The method of claim 1, wherein transmitting the capability of the UE indicates a need for a time division multiplexing (TDM) pattern.

9. The method of claim 1, wherein transmitting the capability of the UE includes indicating support for multiple timing advance groups (TAGs) within a band that is shared by the source base station and the target base station.

10. An apparatus for wireless communication at a user equipment (UE), comprising:
a memory; and
at least one processor coupled to the memory and configured to:
transmit, to a source base station, a capability of the UE associated with a bandwidth class or a band combination, the capability being for a type of a handover in which the UE maintains connections with the source base station and a target base station and supports overlapping data communication that overlap in time with the source base station and the target base station in the bandwidth class or with the band combination during the handover;
receive a handover message from the source base station serving the UE to handover from the source base station to the target base station, wherein the handover message comprises at least one of a target base station configuration to apply during handover execution or a source base station configuration to apply during the handover execution based on the capability of the UE associated with the bandwidth class or the band combination for the handover;
establish a first connection with the target base station;
maintain a second connection with the source base station over a period of time during the handover; and
communicate with the source base station and the target base station during the handover execution using at least one of the target base station configuration or the source base station configuration.

11. A method for wireless communications by a source base station, comprising:
receiving, from a user equipment (UE), a capability of the UE associated with a bandwidth class or a band combination, the capability being for a type of a handover in which the UE maintains connections with the source base station and a target base station and supports overlapping data communication that overlap in time with the source base station and the target base station in the bandwidth class or with the band combination during the handover;
transmitting a handover message to the UE to handover from the source base station to the target base station, wherein the handover message comprises at least one of a target base station configuration to apply during handover execution or a source base station configuration to apply during the handover execution based on the capability of the UE associated with the bandwidth class or the band combination for the handover;
maintaining a connection with the UE over a period of time during the handover; and
communicating with the UE during the handover execution using at least the source base station configuration.

12. The method of claim 11, wherein the capability that is received from the UE comprises a UE capability for at least one of an inter-frequency handover, an intra-band and inter-frequency handover, and an inter-band handover involving the band combination.

13. The method of claim 11, wherein the capability that is received from the UE comprises a UE capability for an intra-frequency handover in which the UE maintains connections with the source base station and the target base station in the bandwidth class.

14. The method of claim 11, wherein the capability that is received from the UE comprises a number of supported component carriers (CCs) for an intra-band handover.

15. The method of claim 14, wherein the capability indicates at least one of:
the capability based on a carrier aggregation (CA) bandwidth class,
a maximum number of CCs that are supported by the UE for the intra-band handover,
a maximum bandwidth supported by the UE for the intra-band handover,
a number of CCs that includes overlapped CCs for intra-frequency handover, supported uplink component carriers that are indicated by a first bandwidth class, or supported downlink component carriers that are indicated by a second bandwidth class.

16. The method of claim 11, wherein the capability that is received from the UE comprises at least one of support for synchronous handover for a synchronous source cell and target cell or asynchronous handover for an asynchronous source cell and target cell, wherein the capability is indicated per band combination.

17. The method of claim 16, wherein the capability of the UE that is transmitted to the source base station comprises an indication of whether the UE supports at least one of the synchronous handover per band combination and per band of a respective band combination.

18. The method of claim 11, wherein the capability of the UE that is received from the UE comprises a need for a time division multiplexing (TDM) pattern.

19. The method of claim 11, wherein the capability of the UE that is received from the UE comprises support for multiple timing advance groups (TAGs) within a band that is shared by the source base station and the target base station.

20. A method for wireless communications by a target network entity, comprising:
receiving, from a source network entity, a capability of a user equipment (UE) associated with a bandwidth class or a band combination, the capability being for a type of a handover in which the UE maintains connections with the source network entity and the target network entity and supports overlapping data communication that overlap in time with the source network entity and the target network entity in the bandwidth class or with the band combination during the handover;
transmitting, to the source network entity, a target network entity configuration to apply during handover execution or a source network entity configuration to apply during the handover execution based on the capability of the UE associated with the bandwidth class or the band combination for the handover; and
communicating with the UE during the handover execution using at least the target network entity configuration.

21. The method of claim 20, wherein the capability that is received from the source network entity comprises a UE capability for at least one of an inter-frequency handover, an intra-band and inter-frequency handover, and an inter-band handover involving the band combination.

22. The method of claim 20, wherein the capability that is received from the source network entity comprises a UE capability for an intra-frequency handover in the bandwidth class.

23. The method of claim 20, wherein the capability that is received from the source network entity comprises a number of supported component carriers (CCs) for an intra-band handover.

24. The method of claim 23, wherein the capability indicates at least one of:
the capability based on a carrier aggregation (CA) bandwidth class,
a maximum number of CCs that are supported by the UE for the intra-band handover,
a maximum bandwidth supported by the UE for the intra-band handover,
a number of CCs that includes overlapped CCs for intra-frequency handover, supported uplink component carriers that are indicated by a first bandwidth class, or
supported downlink component carriers that are indicated by a second bandwidth class.

25. The method of claim 20, wherein the capability that is received from the source network entity comprises at least one of support for synchronous handover for a synchronous source cell and target cell or asynchronous handover for an asynchronous source cell and target cell, wherein the capability is indicated per band combination.

26. The method of claim 25, wherein the capability that is received from the source network entity comprises an indication of whether the UE supports at least one of the synchronous handover per band combination and per band of a respective band combination.

27. The method of claim 20, wherein the capability that is received from the source network entity comprises a need for a time division multiplexing (TDM) pattern.

28. The method of claim 20, wherein the capability that is received from the source network entity comprises support for multiple timing advance groups (TAGs) within a band that is shared by the source network entity and the target network entity.

* * * * *